(12) United States Patent
Bao et al.

(10) Patent No.: US 12,275,005 B2
(45) Date of Patent: Apr. 15, 2025

(54) LUMINESCENT DIAMOND AND METHOD OF MAKING THE SAME

(71) Applicant: Schlumberger Technology Corporation, Sugar Land, TX (US)

(72) Inventors: Yahua Bao, Orem, UT (US); J. Daniel Belnap, Lindon, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/701,854

(22) PCT Filed: Dec. 8, 2022

(86) PCT No.: PCT/US2022/052223
§ 371 (c)(1),
(2) Date: Apr. 16, 2024

(87) PCT Pub. No.: WO2023/107602
PCT Pub. Date: Jun. 15, 2023

(65) Prior Publication Data
US 2024/0326000 A1 Oct. 3, 2024

Related U.S. Application Data

(60) Provisional application No. 63/374,035, filed on Aug. 31, 2022, provisional application No. 63/287,341, filed on Dec. 8, 2021.

(51) Int. Cl.
*C09K 11/65* (2006.01)
*B01J 3/06* (2006.01)

(52) U.S. Cl.
CPC ............. *B01J 3/067* (2013.01); *C09K 11/65* (2013.01); *B01J 2203/0655* (2013.01); *B01J 2203/0685* (2013.01)

(58) Field of Classification Search
CPC ... C09K 11/65; B01J 3/067; B01J 3/06; B01J 3/065; B01J 2203/062; B01J 2203/0655; B01J 2203/0685
See application file for complete search history.

(56) References Cited

U.S. PATENT DOCUMENTS

| 7,323,156 B2 | 1/2008 | Vagarali |
| 2005/0260935 A1* | 11/2005 | Anthony ................. B01J 3/062 |
| | | 451/53 |

(Continued)

FOREIGN PATENT DOCUMENTS

WO 2020081965 A1 4/2020

OTHER PUBLICATIONS

Wikipedia, Nitrogen-vacancy center, 20 pages, downloaded from https://en.wikipedia.org/wiki/Nitrogen-vacancy_center (Year: 2024).*

*Primary Examiner* — Matthew E. Hoban
*Assistant Examiner* — Lynne Edmondson
(74) *Attorney, Agent, or Firm* — Jeffrey D. Frantz

(57) ABSTRACT

Luminescent diamond is made subjecting a volume of diamond grains and catalyst material to high-pressure/high-temperature (HPHT) conditions. A pressure apparatus and/or a pressure cell is specially configured to impose a differential or asymmetric pressure onto the diamond volume during the HPHT conditions. This subjects the diamond grains to differential strain that increases the degree of plastic deformation of the diamond grains to increase the formation of nitrogen vacancy centers. Diamond pellets formed by such process and subjected to differential pressure can have an aspect ratio, or an aspect ratio change, of greater than one. The temperature of the HPHT process is 1.800° C. or less to facilitate desired nitrogen migration to preferentially promote formation of NV centers over NVN and N3 centers in the diamond pellets to provide a degree of luminescence in (Continued)

a red wavelength spectrum greater than diamond pellets formed by some other HPHT processes.

14 Claims, 11 Drawing Sheets

(56) References Cited

U.S. PATENT DOCUMENTS

| | | |
|---|---|---|
| 2010/0307070 A1 | 12/2010 | Bertagnolli |
| 2011/0209642 A1 | 9/2011 | Fujimura |
| 2019/0292451 A1* | 9/2019 | Shenderova ......... C09K 11/025 |
| 2019/0322930 A1 | 10/2019 | Dalis |
| 2023/0257648 A1 | 8/2023 | Bao |

* cited by examiner

LUMINESCENT DIAMOND AND METHOD OF MAKING THE SAME

CROSS-REFERENCE TO RELATED APPLICATIONS

This application is the National Stage Entry of International Application No. PCT/US2022/052223, filed Dec. 8, 2022, which claims the benefit of, and priority to, U.S. patent application Ser. No. 63/287,341, filed Dec. 8, 2021, and to U.S. patent application Ser. No. 63/374,035, filed Aug. 31, 2022, which applications are incorporated herein by this reference in their entireties.

BACKGROUND

Laser-infused fluorescence is a known technique adopted for better understanding how biological systems function at a cellular, sub-cellular, or molecular level through the probing of tissues, cells, and biomolecules individually for observation. In an example, laser-infused fluorescence may be applied to image and track a single molecule or particle in a biological cell or the like, e.g., in-vivo biological sensors for internal organ mapping, cell imaging, and the like. One type of substance used for laser-infused fluorescence is luminescent nanodiamond, which is nano-sized diamond particles or grains that has been developed to emit light when excited by a light source within a desired wavelength as called for by the end-use application.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Luminescent diamond as disclosed herein may be made by placing a volume of precursor diamond grains and catalyst material in a pressure cell, and subjecting the pressure cell to high-pressure/high-temperature (HPHT) conditions. In an example, a pressure apparatus is specially configured to impose a differential or asymmetric pressure onto the diamond volume during the HPHT conditions to thereby subject the diamond grains to differential strain that operates to increase plastic deformation of the diamond grains to create increase in the formation of nitrogen vacancy centers. In an example, the pressure cell is specially configured to impose the differential or asymmetric pressure on to the diamond volume during the HHT conditions to thereby subject the diamond grains to differential strain that operates to increase plastic deformation of the diamond grains to create increase the formation of nitrogen vacancy centers.

In an example, the diamond pellets formed by such process and subjected to differential pressure are shown to have an aspect ratio of greater than one, or undergo a change in aspect ratio that is greater than one. In an example, where the cell or pressure apparatus is configured to impose a pressure force in an axial direction that is greater than in a radial direction, the diamond grains are subject to a negative strain in the axial direction and a positive strain in the radial directions, and the resulting diamond pellets and/or the pressed diamond material are shown undergo an aspect ratio change greater than one when measured between an axial direction and a radial direction.

In an example, during the step of subjecting, the temperature of the HPHT process is about 1,800° C. or less to facilitate desired nitrogen migration and preferentially promote the formation of nitrogen vacancy (NV) centers in the diamond pellets. In an example, the diamond volume may have an optimized diamond content of from about 75 to 80 wt % based on the total weight of the diamond grains and catalyst material. In an example, the diamond volume may have an optimized diamond content of from about 70 to 100 wt %, 80 to 95 wt %, greater than 80 wt %, and in a particular example approximately 85 wt %. In an example, the catalyst material is a non-metal solvent catalyst such as sodium carbonate and the like. In an example, the resulting diamond pellets have a majority of NV centers when compared to combined di-nitrogen vacancy (NVN) centers and by a vacancy center with three surrounding nitrogen atoms (N3). The majority NV population causes the resulting diamond pellets to have a degree of luminescence in a red wavelength spectrum that is greater than diamond pellets formed by conventional HPHT process, i.e., where the diamond grains are subjected to a equalized or symmetric pressure that does not impose a differential strain and promote an increased degree of plastic deformation driving the formation of nitrogen vacancy centers.

In an example, luminescent diamond as disclosed herein formed by HPHT processing may be reduced in size to nano-sized luminescent diamond particles useful for forming an aqueous suspension of the nano-sized luminescent diamond particles. In an example, the luminescent diamond used to form such suspension may have the increased diamond content disclosed above, e.g., of from about 70 to 100 wt %, 80 to 95 wt %, greater than 80 wt %, and in a particular example approximately 85 wt %. In an example, the nano-sized luminescent diamond particles may have an average particle size of approximately 100 nanometers. In an example, the nano-sized particles may be washed and heat treated prior to formation of the aqueous suspension. In an example, the nano-sized diamond particles may be heat treated at a temperature of from about 400 to 550° C. In an example, the aqueous suspension may have a nano-sized luminescent diamond particle content of approximately 0.1 wt % based on the total weight of the suspension. In an example, the suspension may have a photoluminescent intensity in a green wavelength spectrum under excitation of a 473 nanometer laser of greater than about 10,000 arbitrary units (a.u.), and greater than about 12,000 a.u. depending on the diamond wt % content.

BRIEF DESCRIPTION OF THE DRAWINGS

These and other features and aspects of luminescent nanodiamond and methods of making the same as disclosed herein will be appreciated as the same becomes better understood by reference to the following detailed description when considered in connection with the accompanying drawings where:

FIG. 1-2 is a schematic cross-sectional side view illustrating diamond grain deformation and resulting diamond pellets formed using the standard cell construction of FIG. 1-1, wherein the resulting diamond pellets have not undergone a differential strain and are shown to have an aspect ratio of approximately one, according to some embodiments of the present disclosure;

FIG. 2-1 is a schematic cross-sectional magnified view of a conventional mixture of diamond grains and catalyst material before high-pressure/high-temperature processing showing the presence of nitrogen atoms therein, according to some embodiments of the present disclosure;

FIG. 2-2 is a schematic cross-sectional magnified view of the mixture of FIG. 2-1 during a first stage of a conventional high-pressure/high-temperature process causing deformation and related nitrogen vacancy centers when subjected to an equivalent, equalized, or symmetric pressure force, according to some embodiments of the present disclosure;

FIG. 2-3 is a schematic cross-sectional magnified view of the mixture of FIG. 2-1 during a second stage of the conventional high-pressure/high-temperature process at a temperature below 1800° C. showing nitrogen diffusion to form NV centers, according to some embodiments of the present disclosure;

FIG. 2-4 is a schematic cross-sectional magnified view of the mixture of FIG. 2-1 during a second stage of the conventional high-pressure/high-temperature process at a temperature between 180° and 2300° C. showing nitrogen diffusion to form NVN centers, according to some embodiments of the present disclosure;

FIG. 2-5 is a schematic cross-sectional magnified view of the mixture of FIG. 2-1 during a second stage of the conventional high-pressure/high-temperature process at a temperature above 2300° C. showing nitrogen diffusion to form N3 centers, according to some embodiments of the present disclosure;

FIG. 3-1 is a schematic cross-sectional magnified view of a mixture of diamond grains and catalyst material as disclosed herein before high-pressure/high-temperature processing showing the presence of nitrogen atoms therein, according to some embodiments of the present disclosure;

FIG. 3-2 is a schematic cross-sectional magnified view of the mixture of FIG. 3-1 during a first stage of a high-pressure/high-temperature process as disclosed herein causing deformation, differential strain, and forming related nitrogen vacancy centers when subjected to a differential or asymmetric pressure force as disclosed herein, according to some embodiments of the present disclosure;

FIG. 3-3 is a schematic cross-sectional magnified view of the mixture of FIG. 3-1 during a second stage of the high-pressure/high-temperature as disclosed herein at a temperature below 1800° C. to limit nitrogen diffusion to form primarily NV centers, according to some embodiments of the present disclosure;

FIG. 4-1 is a schematic cross-sectional side view of an example cell construction as disclosed herein configured to promote a greater degree of diamond grain deformation in a radial direction during high-pressure/high-temperature processing conditions, thereby subjecting the diamond pellets formed to a differential strain, according to some embodiments of the present disclosure;

FIG. 4-2 is a schematic cross-sectional side view illustrating diamond grain deformation and resulting diamond pellets formed using the example cell construction of FIG. 4-1, wherein the resulting diamond pellets have undergone a differential strain and are shown to have an aspect ratio of greater than one, according to some embodiments of the present disclosure;

FIG. 5-1 is a schematic cross-sectional side view of an example cell construction as disclosed herein configured to promote a greater degree of diamond grain deformation in a radial direction during high-pressure/high-temperature processing conditions, thereby subjecting the diamond pellets formed to a differential strain, according to some embodiments of the present disclosure;

FIG. 5-2 is a schematic cross-sectional side view illustrating diamond grain deformation and resulting diamond pellets formed using the example cell construction of FIG. 5-1, wherein the resulting diamond pellets have undergone a differential strain and are shown to have an aspect ratio of greater than one, according to some embodiments of the present disclosure;

FIG. 6-1 is a schematic cross-sectional side view of a standard cell construction as used with a standard pressure apparatus that imposes equivalent, equalized, or symmetric axial and radial pressure on the cell construction for subjecting diamond grains in the cell construction to high-pressure/high-temperature processing conditions, according to some embodiments of the present disclosure;

FIG. 6-2 is a schematic cross-sectional side view illustrating diamond grain deformation and resulting diamond pellets formed using a standard pressure apparatus and the standard cell construction of FIG. 6-1, wherein the resulting diamond pellets have not undergone a differential strain and are shown to have an aspect ratio of approximately one, according to some embodiments of the present disclosure;

FIG. 7-1 is a schematic cross-sectional side view of a standard cell construction as used with an example pressure apparatus as disclosed herein configured to impose a differential pressure on the cell in axial and radial directions to promote a greater degree of diamond grain deformation in a radial direction during high-pressure/high-temperature processing conditions, thereby subjecting the diamond pellets formed to a differential strain, according to some embodiments of the present disclosure;

FIG. 7-2 is a schematic cross-sectional side view illustrating diamond grain deformation and resulting diamond pellets formed using the example pressure apparatus of FIG. 7-1, wherein the resulting diamond pellets have been subjected to differential strain and are shown to have an aspect ratio of greater than one, according to some embodiments of the present disclosure;

FIG. 10-1 is a graph that shows the photoluminescent intensity vs. wavelength for an 85% diamond content material subsequently heat treated at 515° C.; and FIG. 10-2 is a graph that shows the luminescent intensity of luminescent diamond as a function of diamond content, according to some embodiments of the present disclosure.

DETAILED DESCRIPTION

Figure 1:
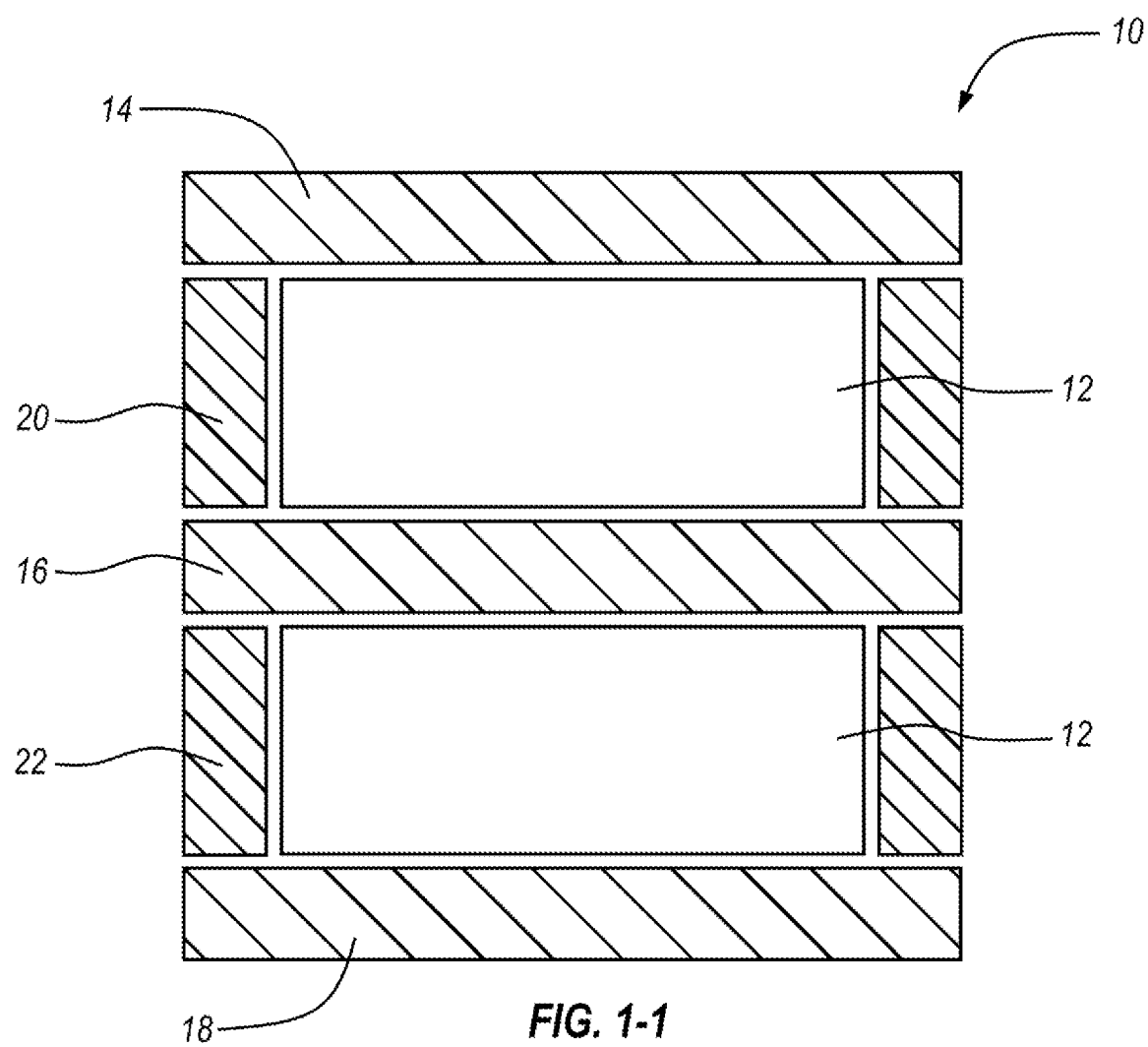
FIG. 1-1 is a schematic cross-sectional side view of a standard cell construction used for subjecting diamond grains to high-pressure/high-temperature processing conditions, according to some embodiments of the present disclosure.

Some embodiments of the present disclosure relate to luminescent diamond, which may also be referred to as photoluminescent diamond. In some additional embodiments, methods and devices are described which are useful for producing luminescent diamond, including producing diamond pellets having an enhanced degree of plastic deformation and an increased amount of nitrogen vacancy centers (NV, NVN, or N3). The increase in nitrogen vacancy centers can produce an increased degree of luminescence in one or more spectra. For instance, the increased luminescence may occur in the red wavelength spectrum.

In some embodiments, luminescent diamond (e.g., photoluminescent diamond) and methods for making the same as disclosed herein is engineered in a manner that increases manufacturing efficiency and manufacturing volume to thereby improve affordability and availability of the substance for end-use applications including and not limited to the biological uses. Luminescent diamond may in such embodiments be produced with less expense, energy, time, or any combination thereof, potentially increasing the availability of such luminescent diamond.

Further, in some embodiments, luminescent diamond as prepared in accordance with the principles disclosed herein display a level of luminescence intensity that is similar to or greater than that of conventional luminescent diamond, thereby presenting an opportunity for expanding the range of potential end-use applications for such material. For purposes of clarity, in some embodiments luminescent diamond of some embodiments herein is formed initially by consolidation and compaction of pre-existing diamond grains, forming a luminescent active sintered body or slug (characterized by a high degree of intercrystalline diamond bonding), or forming a mechanically combined semi-sintered body or slug (characterized by a lesser degree or substantially no intercrystalline diamond bonding). In such condition, the consolidated material is referred to herein as luminescent diamond. During subsequent processing, the luminescent diamond may be heat treated and/or reduced in size as called for by a particular end use, and in some embodiments, the resulting diamond particles or grains may be nano-scale in size. In some instances, the reduced sized luminescent diamond may be exclusively nano-size particles, or may include a combination of nano-size particles with coarser diamond particles. The term "nanodiamond" as used herein is understood to refer to luminescent diamond including nano-size diamond particles, e.g., having an average size up to 1000 nm (e.g., between 1 nm and 1000 nm).

In some embodiments, luminescent diamond as disclosed herein may be formed by combining a volume of precursor diamond grains, which may be in the form of natural and/or synthetic diamond grains, and placing the volume of diamond grains into a cell, can, or container as conventionally used for diamond grain consolidation. In an example, the diamond grains may have an average grain size from 1 μm to 1000 μm, from 1 μm to 100 μm, or from 10 μm to 50 μm. In other embodiments, the initial diamond grain or powder sizes may extend into the submicron or nanodiamond range, as described herein. In some embodiments, nanosized powders formed either by mechanical crushing of conventional diamond powders or detonation processes can be employed in a similar manner. The conventional diamond powders can either be of synthetic or natural origin; however, in some cases, synthetic diamond powder has a higher intrinsic nitrogen content which along with an adjacent vacancy center makes the diamond luminescent active. In an example, the starting diamond material has an intrinsic amount of nitrogen impurity that is consistent with that found in diamond designated as type 1b, (e.g., 50 ppm nitrogen or higher). Nanopowders synthesized through shock synthesis can have higher intrinsic nitrogen content as well.

In example embodiments, the cell, can, or container (each a cell or pressure cell) is specially configured to impose a differential or asymmetric pressure, e.g., an axial pressure that is different than a radial direction, onto its contents when subjected to a high-pressure/high-temperature (HPHT) consolidation process using conventional press equipment for making polycrystalline diamond. As described in greater detail herein, the differential pressure imposed by the cell as disclosed herein can cause a greater degree of plastic deformation to occur and thereby produce a greater number of nitrogen vacancy centers useful to increase the amount of NV centers formed in the resulting luminescent diamond pellets, and to correspondingly increase the amount of luminescence in the red wavelength spectrum. In example embodiments, the press equipment or apparatus used to impose pressure on the cell, can, or container may be specially configured to impose a differential or asymmetric pressure (e.g., an axial pressure that is different than a radial pressure) onto the cell and the contents within the cell when subjected to a HPHT consolidation process using such specially configured press equipment for making polycrystalline diamond. As described in greater detail herein, the differential pressure imposed by the press equipment as disclosed herein can cause a greater degree of plastic deformation to occur and thus produce a greater number of nitrogen vacancy centers useful to increase the amount NV centers formed in the resulting luminescent diamond pellets to increase the amount of luminescence (e.g., in the red wavelength spectrum).

In another example embodiment, the pressure differential is at least 5%. For instance, an axial pressure applied by press equipment or with a pressure cell may be at least 5%, 10%, 15%, 25%, 50%, 100%, or 200% (or any value therebetween) greater than a radial pressure applied by press equipment or a with a pressure cell. In other embodiments, the radial pressure applied by press equipment or with a pressure cell may be at least 5%, 10%, 15%, 25%, 50%, 100%, or 200% (or any value therebetween) greater than an axial pressure applied by press equipment or a with a pressure cell.

In an example embodiment, the volume of diamond grains is placed into the cell, can, or container and the cell, can, or container may or may not be sealed and is placed within an HPHT press and subjected to desired sintering pressure and temperature conditions. In some embodiments, the HPHT process temperature may be in the range of from 1300 to 2500° C., and the process pressure may be from about 3.0 GPa to about 10 GPa. In an example where it is desired to increase the amount of NV centers formed in the luminescent diamond during the HPHT process, it may be desired that the HPHT process temperature be controlled to about 1800° C. or less (e.g., in the range from 1500° C. to 1800° C., in a range from 1350° C. to 1600° C.) and in some instances less than 1500° C. (e.g., from 1300° C. to 1500° C.) to thereby limit the rate of nitrogen diffusion, which in turn controls nitrogen migration to the vacancy sites. With less nitrogen migration, NV centers can be preferentially produced over other nitrogen vacancy centers (e.g., NVN or N3 centers) that may use more nitrogen atoms.

The NV centers produce luminescence in the red wavelength spectrum. In particular, in the red wavelength spectrum, the luminescence may have a wavelength between 620 nm and 700 nm, between 630 nm and 700 nm, and/or have a peak centered between 650 nm and 680 nm (e.g., at 660 nm or 675 nm). In some embodiments, NV centers can preferentially be produced over other nitrogen vacancy centers. For instance, NV centers can be preferentially produced over NVN centers which produce luminescence in the green wavelength spectrum (e.g., having a wavelength between 495 nm and 570 nm, such as with a peak centered at 525 nm). To preferentially create NV centers, or even to create primarily or only NV centers, the nitrogen diffusion can be somewhat suppressed as the previously mentioned nitrogen concentration (e.g., >50 ppm) may always be higher than the NV concentration (e.g., between 1 ppm and 3 ppm in some commercial material). In some embodiments and methods, suppression of nitrogen diffusion may be required in order to preferentially or primarily produce NV centers.

In an example, the volume of diamond grains may be substantially free of a catalyst material, so that diamond material resulting from the HPHT process is not fully sintered, but rather is in the form of a semi-sintered slug or body including diamond grains that are mechanically combined together by frictional contact, cold welding, diamond self-diffusion, and the like. In an example, the volume of diamond grains may include some amount of catalyst material, and the type of catalyst material can vary (e.g., the catalyst material may be a metal solvent catalyst or may be a non-metal solvent catalyst as described herein). In an example, the diamond grains are combined with a non-metal solvent material. In some embodiments, a feature of producing a diamond material that is not fully sintered (i.e., that is semi-sintered and not characterized by a network of bonded-together diamond grains making use of a conventional metal solvent catalyst) is that the relative transparency of the same as contrasted with a fully sintered polycrystalline diamond body can be improved, and the transparency may improve the intensity of luminescent emission therefrom. There may also be graphite that forms in the porous regions of the semi-sintered body, which may decrease the intensity of the luminescence. In such case, it may be desired that the graphitic material be partially or completely removed as part of the manufacturing process.

During the HPHT process, it has been discovered that at least a portion of the volume of precursor diamond grains can undergo plastic deformation. In some embodiments, the extent of the HPHT consolidation process is such to cause sufficient plastic deformation and nitrogen diffusion in the diamond grains to create nitrogen vacancy centers (e.g., including one or both of nitrogen vacancy (NV) or di-nitrogen vacancy (NVN) centers, and/or to create optical centers with three nitrogen atoms surrounding a vacancy (N3) center in the diamond grains that operate to make the diamond grains luminescent active). As a result of testing by the inventors, plastic deformation of diamond particles during HPHT is known to create vacancy centers as deformation mechanisms such as crystallographic dislocation motions become active, which vacancies can in turn combine with nitrogen impurities to form vacancy centers that include one or more of the NV centers, NVN centers, or N3 optical centers which create the desired luminescent activity. In some embodiments, this occurs during conventional sintering of polycrystalline diamond with metal catalysts (e.g., cobalt that functions to promote intercrystalline diamond bonding during the HPHT process) or non-metal catalysts/pressure transfer media (e.g., carbonates and chlorides that do not promote intercrystalline diamond bonding during the HPHT process). In other embodiments, the diamond grains resulting from the HPHT process may be heavily plastically deformed to intentionally create more extensive NV and/or NVN centers and/or N3 centers, while inducing weak diamond-diamond bonding in comparison to solvent catalyst bonded polycrystalline diamond. For example, in some embodiments, it is desired that the diamond grains incur such plastic deformation giving rise to luminescent activity during the HPHT process without resulting in a fully-sintered body, thereby making the downstream process of sizing the diamond grains, by a crushing process or the like, easier and less energy intensive. For instance, in lieu of other and additional actions, only breaking apart mechanically combined diamond grains may be required.

In some embodiments, luminescent diamond as disclosed herein may be formed in a similar manner, by subjecting a volume of diamond precursor grains to an HPHT process in the presence of a catalyst material. In such embodiments, the type of catalyst materials used may be selected from the group including and not limited to Co, Fe, Ni, carbonates, or combinations thereof for production of a polycrystalline diamond (PCD) product. In some embodiments, Si is added and may be used to make a reaction-bonded silicon carbide PCD product. In some embodiments, HPHT processing conditions for cobalt PCD may be within a temperature of from 1300° C. to 1500° C. and pressures from 5.0 GPa to 7.5 GPa. In addition, cobalt PCD can be heat treated in vacuum at temperatures of 600° C. to 700° C. The amount of the catalyst material used can and will vary depending on such factors as the type of catalyst used, the amount of luminescence desired, and the particular end-use application. In biological end-use applications, for biocompatibility reasons, the presence of a metal material in the luminescent diamond may not be desired and/or permitted, in which case it may be desired to use non-metallic catalyst. In some embodiments, using a non-metallic catalyst results in a PCD body having relatively higher transparency or reduced opacity when compared to PCD formed using a metal solvent catalyst. In some embodiments, non-metallic catalyst useful for making luminescent diamond as disclosed herein includes carbonate catalysts such as magnesium carbonate, sodium carbonate, calcium carbonate, or the like, resulting in the formation of carbonate PCD (CPCD).

Figures 1, 2:
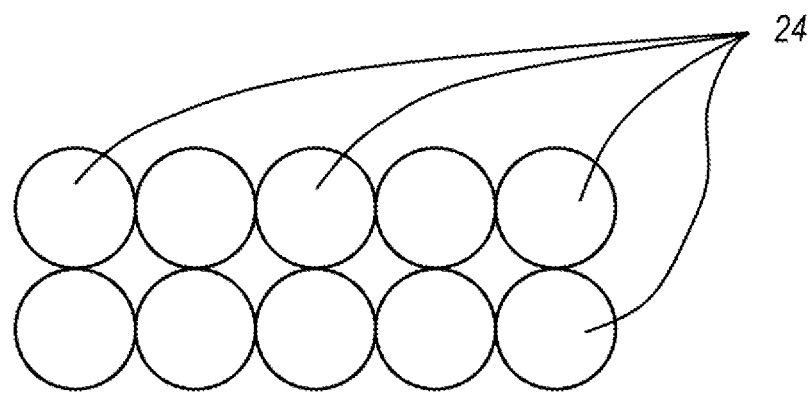

FIG. 1-1 illustrates a conventional or standard cell or container 10 used for forming polycrystalline diamond by HPHT process. In such example, the cell 10 comprises one or more internal chambers 12 that are configured to accommodate a volume of diamond grains therein, which may be a mixture of diamond grains and catalyst material. In such example, the cell includes axial elements 14, 16, and 18 that are formed from pressed disks such as sodium chloride, cesium chloride, or the like, and radial elements 20 and 22 in the form of rings formed from pressed sodium chloride, cesium chloride, or the like. The example cell 10 is configured to receive an equivalent, equalized, or symmetric pressure (equal pressure in the axial and radial directions) imposed onto it by a press apparatus and transmit and impose an equalized or symmetric pressure onto the volume of diamond grains in the chambers 12. While a cell such as that illustrated in FIG. 1-1 is useful for forming luminescent diamond during HPHT processing under pressing temperatures from 1800° C. to 2300° C., the luminescent diamond that is produced may have a number of NVN centers (emitting luminescence in a green wavelength spectrum) and a lesser number of NV centers (emitting luminescence in a red wavelength spectrum), resulting in a relatively low overall emission of luminescence in the red wavelength spectrum. This relatively low number of NV centers is believed to be due to a relatively low amount of plastic deformation that takes place along with a relatively high amount of nitrogen present to migrate to and fill nitrogen centers during the HPHT process. The high amount of available nitrogen and low amount of nitrogen vacancies favors NVN center formation in the luminescent diamond made in such manner. Below 1800° C. it has been observed that primarily NV centers form; however, the NV centers may not form in sufficiently high concentration to give luminescence intensities comparable to commercially available NV nanodiamond material. This is believed to be due to insufficient diamond plastic deformation and vacancy center formation at temperatures less than 1800° C. FIG. 1-2 illustrates diamond grains 24 that may be formed using the cell 10 and imposing an equalized force during the HPHT process. As illustrated, the resulting diamond grains are subjected to an equalized strain and have an aspect ratio as measured between a width dimension and a height dimension that is approximately one.

FIGS. 2-1 to 2-5 illustrate a volume of a conventional mixture of diamond powder catalyst material when subjected to HPHT process for forming diamond pellets as described with respect to FIGS. 1-1 and 1-2. FIG. 2-1 illustrates a volume 200 of a conventional mixture of diamond powder and catalyst material before being subjected to HPHT processing and illustrates nitrogen atoms 202 present in the mixture. FIG. 2-2 illustrates the diamond volume 204 after being subjected to a first stage of HPHT processing where an equivalent, equal, or symmetric pressure is imposed onto the volume by a press apparatus and using a cell, wherein in such first stage the diamond volume is subjected to pressure without significantly elevating the temperature. After this initial pressurization, heat can be increased such that temperature in the volume is increased inside the cell. Any diamond plastic deformation is due to the randomly oriented distortion of the diamond crystals in response to the applied heat and pressure, as the HPHT cell is designed to provide uniformity in applied pressure. The combination of heat and pressure with the randomly oriented diamond crystals induces plastic deformation in the diamond crystals, which create vacancies 206 in the diamond lattice.

Figures 1, 2:
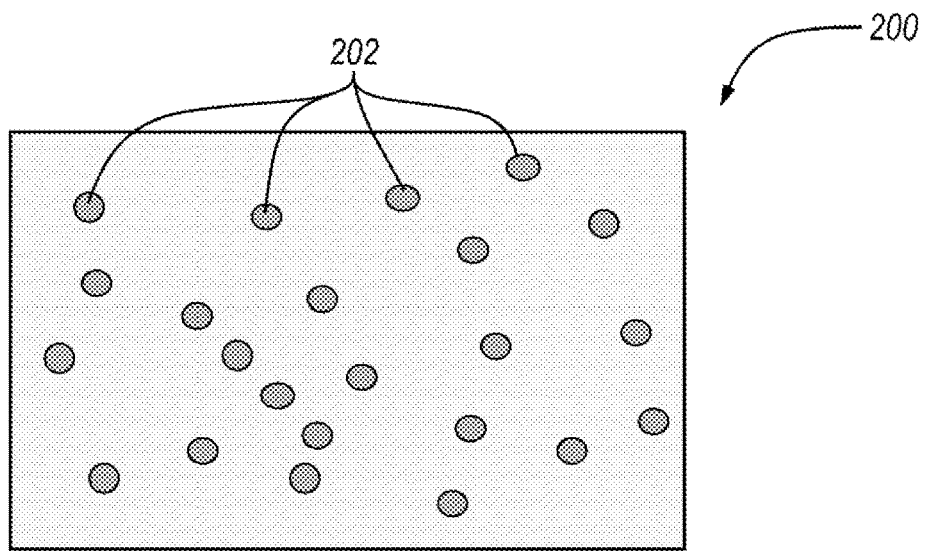
Figure 2:
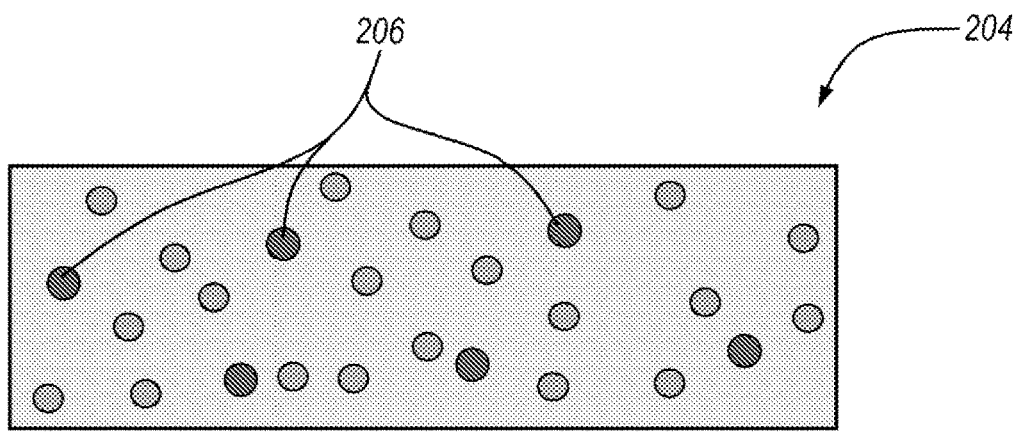
Figures 2, 3:
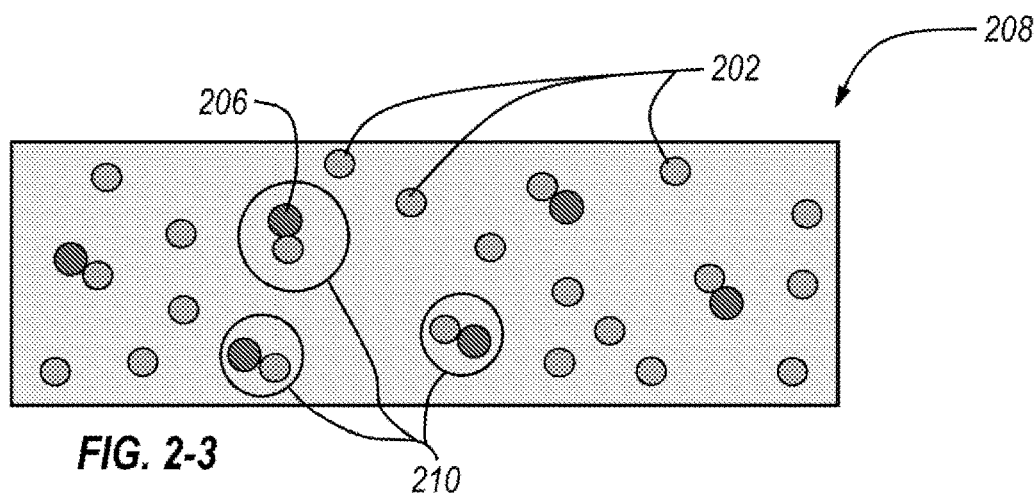
Figures 2, 3, 4:
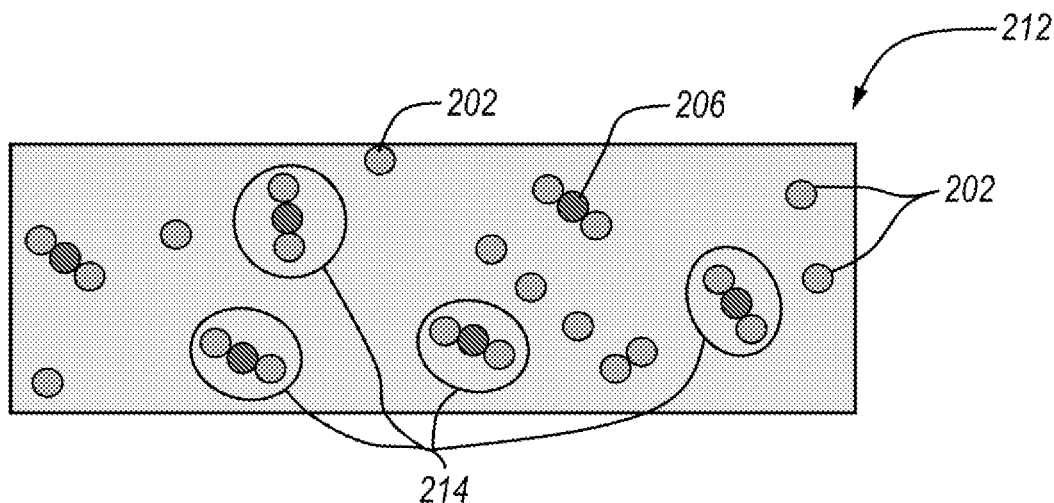

FIG. 2-3 illustrates the diamond volume 208 after being subjected to a second stage of the HPHT process as described with equal axial and radial pressures, where the equivalent, equal, or symmetric pressure is maintained and the temperature is increased to a temperature below 1800° C., causing the nitrogen atoms 202 to diffuse and migrate to the vacancies 206 to form nitrogen vacancy centers that include NV centers 210. FIG. 2-4 illustrates the diamond volume 212 after being subjected to a second stage of the described HPHT process where the equivalent, equal, or symmetric pressure is maintained and the temperature is increased to between 1800° C. and 2300° C., causing a greater amount of the nitrogen atoms 202 (relative to those in FIG. 2-3) to diffuse and migrate to the vacancies 206 to thereby form nitrogen vacancy centers that include NVN centers 214. FIG. 2-5 illustrates the diamond volume 216 after being subjected to a second stage of the described HPHT process where the equivalent, equal, or symmetric pressure is maintained and the temperature is increased to above 2300° C., causing a greater amount of the nitrogen atoms 202 (relative to those in FIG. 2-4) to diffuse and migrate to the vacancies 206 to thereby form nitrogen vacancy centers that include N3 centers 218.

Accordingly, as illustrated in FIGS. 2-1 to 2-5, a diamond volume with a conventional diamond powder can contain a relatively high number of nitrogen atoms available for diffusing and migrating during second stage HPHT processing for forming NV, NVN, and N3 centers depending on the particular HPHT temperature condition. Generally, the combined presence of a relatively high number of nitrogen atoms and an HPHT process with an equivalent, equal, or symmetric pressure condition results in a relatively low amount of nitrogen vacancy formation (during the first stage of HPHT processing) and a relatively high amount of nitrogen available for diffusion and migration to combine with the vacancies driving the formation of nitrogen vacancy centers that include NVN or N3 centers over NV centers. The NV centers may be desirable for some applications to provide luminescence in the red wavelength spectrum.

FIGS. 3-1 and 3-2 illustrate a volume 220 of a mixture of diamond powder catalyst material as disclosed herein when subjected to a HPHT process as disclosed herein for forming diamond pellets that predominantly emit luminescence in the red wavelength spectrum. FIG. 3-1 illustrates the volume 220 of the mixture of diamond powder and catalyst material as disclosed herein before being subjected to HPHT processing as disclosed herein, wherein the volume 220 comprises nitrogen atoms 222 present in the mixture, and wherein there are fewer nitrogen atoms 222 present than in the volume of the more conventional diamond power and catalyst material illustrated in FIG. 2-1. The presence of fewer nitrogen atoms in the volume 220 may be desired for the purpose of reducing the amount of nitrogen present for diffusion and migration during HPHT processing, thereby limiting the amount of nitrogen present for forming NVN and N3 centers and thus driving NV center formation. In some embodiments, the lower nitrogen content diamond is lower than 50 ppm and optionally lower than 25 ppm. To achieve this lower concentration, nitrogen "getters" such as aluminum or titanium powders can be used in the diamond powder synthesis process.

FIG. 3-2 illustrates the diamond volume 224 after being subjected to a first stage of a HPHT process as disclosed herein where a differential or asymmetric pressure is imposed onto the volume by a specially configured press apparatus and/or a specially configured cell, wherein in such first stage the diamond volume is subjected to differential pressure. During pressurization and initial heating of the HPHT process as disclosed herein, the diamond volume 224 can undergo an increased degree of plastic deformation (when compared to the example illustrated in FIG. 2-2) that subjects the volume to differential stress, and that creates diamond pellets having an increased number or concentration of vacancies 226 (when compared to the example illustrated in FIG. 2-2). FIG. 3-3 illustrates the diamond volume 228 after being subjected to a second stage of an HPHT process as disclosed herein, where a differential or asymmetric pressure is applied/maintained and the temperature is optionally changed. For instance, the temperature can be changed or increased to a temperature below 1800° C. (or below 1500° C.), causing the nitrogen atoms 222 to diffuse and migrate to the vacancies 226 to form nitrogen vacancy centers that include NV centers 230. Thus, in some embodiments, once the vacancies 226 are created by differential pressure, the pressure and/or temperature conditions may not be maintained.

Accordingly, as illustrated in FIGS. 3-1 to 3-3, the number of nitrogen atoms in the volume of diamond powders can be controlled to thereby control the amount of nitrogen present for diffusion and migration during the HPHT process. During the HPHT process, the pressure imposed on the volume can also be a differential or asymmetric pressure for the purpose of causing an increased degree of plastic deformation and/or differential stress on the volume. Such differential may create an increased number or concentration of vacancies in the diamond pellets. Also, the temperature can be controlled during the HPHT process to control the number of nitrogen atoms available for diffusion and migration, which may drive the preferential formation of NV centers over NVN and/or N3 centers, thereby resulting in the formation of diamond pellets that emit a majority of luminescence in the red wavelength spectrum.

FIG. 4-1 illustrates an example cell 30 according to embodiments disclosed herein, and which is specially configured to receive an equalized force from an HPHT press apparatus and impose a differential or asymmetric pressure onto the volume of diamond grains contained therein to increase the amount of plastic deformation of the diamond grains, and thereby increase the amount of nitrogen vacancy centers formed therein. In an example, the cell 30 is configured having one or more internal chambers 32 configured to accommodate a volume of diamond grains or a mixture of diamond grains and catalyst material therein. The cell 30 can include axial elements 34, 36, and 38 (e.g., formed from pressed disks of cesium chloride powder) for transmitting the axial pressure force from the press apparatus to the diamond volume in the internal chambers 32. The cell 30 can also include radial elements 40 and 42 (e.g., formed from a material that is configured so as to not transmit the full radial pressure of the press apparatus to the volume of diamond grains). In an example, the radial elements may be formed from loose cesium chloride powder, cesium chloride press components which are less densely compacted, or the like.

Configured in this manner, when subjected to the equalized pressure of the press apparatus during the HPHT process, the cell 30 operates to impose a differential or asymmetric pressure onto the volume of diamond grains. In this example, the cell 30 imposes a greater pressure in the axial direction (y-direction in FIG. 4-1) than in the radial direction (x-direction in FIG. 4-1). While the example cell 30 is configured to impose a greater pressure in the axial direction than in the radial direction, cells as disclosed herein may be configured to impose a greater pressure in the radial direction than in the axial direction, or may be configured to impose differential or asymmetric pressure in other directions and that all such cells configured to impose a differential or asymmetric pressure in different directions on the volume of diamond grains are understood to be within the scope of this disclosure.

FIG. 4-2 illustrates diamond grains 44 as deformed by using the cell 30 and imposing a differential force during the HPHT process. As illustrated, the resulting diamond grains have undergone a differential strain, wherein in one direction the strain is positive and in another direction the strain is negative. The resulting diamond pellet subjected to such differential strain is shown to have an aspect ratio as measured between a width dimension and a height dimension that is greater than one. With reference to FIG. 4-2, the aspect ratio that is schematically illustrated shows a difference between an original (pre-pressed) shape (e.g., see diamond grains 24 of FIG. 1-2) and a resulting (pressed) shape (see diamond grains 44). It should be understood that while the original diamond grains may be generally symmetrical or have an aspect ratio of about one, this is not required. Instead, the pre-pressed diamond grains may also have an aspect ratio less than or greater than one. As a result, when undergoing an HPHT process, the described aspect ratio may be the aspect ratio observable in the physical structure, but may instead be reflected as a change in aspect ratio from the original, pre-pressed shape.

Thus, in some embodiments, the aspect ratio or aspect ratio change is between greater than 1 and 2 (e.g., between greater than 1.1 and 2 or greater than 1.25 and 1.75). As illustrated in FIG. 2-2, the differential pressure imposed on the diamond grains operates to increase the degree of plastic deformation among the diamond grains, thereby operating to create a greater number of nitrogen vacancy centers therein when compared to using the symmetric cell 10 during HPHT processing as discussed with respect to FIG. 1-1.

In some embodiments, rather than describing the aspect ratio or aspect ratio change in terms of shape with reference to the diamond grains, the aspect ratio and aspect ratio change can be reflected in the combination of diamond grains that is pressed. For instance, a billet may be formed of diamond grains, and the billet may be pressed under HPHT conditions as described herein. The billet may then undergo a shape change where the aspect ratio change is greater than one in some embodiments. For instance, a billet with a rectangular cross-sectional shape (see FIG. 9) may undergo HPHT processing and the change in aspect ratio of the billet may be greater than one in some embodiments.

While the cell 30 as disclosed herein can operate to increase the degree of plastic deformation and resulting nitrogen vacancy centers, in order to drive a greater amount of nitrogen vacancy center formation in the resulting luminescent diamond (e.g., increase of NV center creation to promote red luminescence), the HPHT process can be conducted using a controlled temperature (e.g., of about 1800° C. or less) so that the rate of nitrogen diffusion for migration to locations adjacent to the vacancies is somewhat controlled. This can preferentially produce NV centers over NVN centers and/or N3 centers. Accordingly, it is desired in some embodiments that the HPHT process temperature be about 1800° C. or less (e.g., between 500° C. and 1800° C. or between 1200° C. and 1800° C.) from about 1500° C. to 1800° C., or less than about 1500° C. (e.g., between 500° C. and 1500° C., or between 1200° C. and 1500° C.). In some cases it may be beneficial subsequent to the HPHT process to heat treat the material at temperatures in order to improve and potentially maximize luminescent intensity. For instance, the material may be heat treated at a temperature up to 1300° C. in a standard vacuum furnace; however, other heat treatment methods or temperatures (e.g., above or below 1300° C. may be used).

Figures 2, 3, 4, 5:
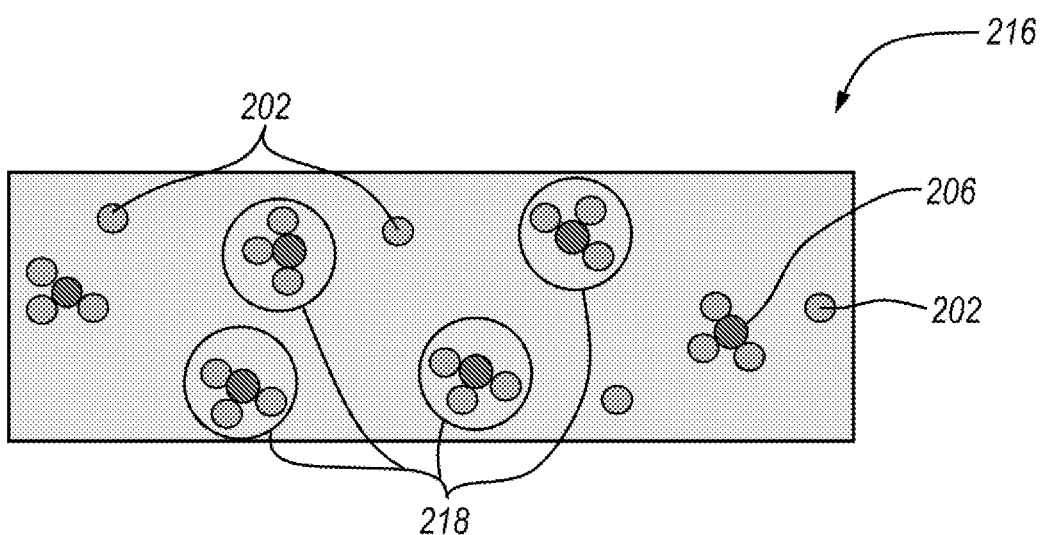
Figures 1, 3:
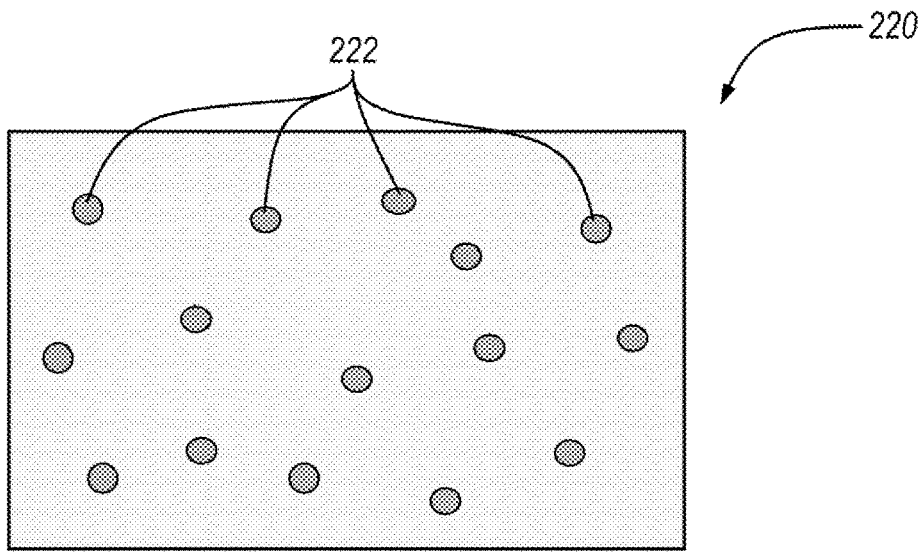
Figures 2, 3:
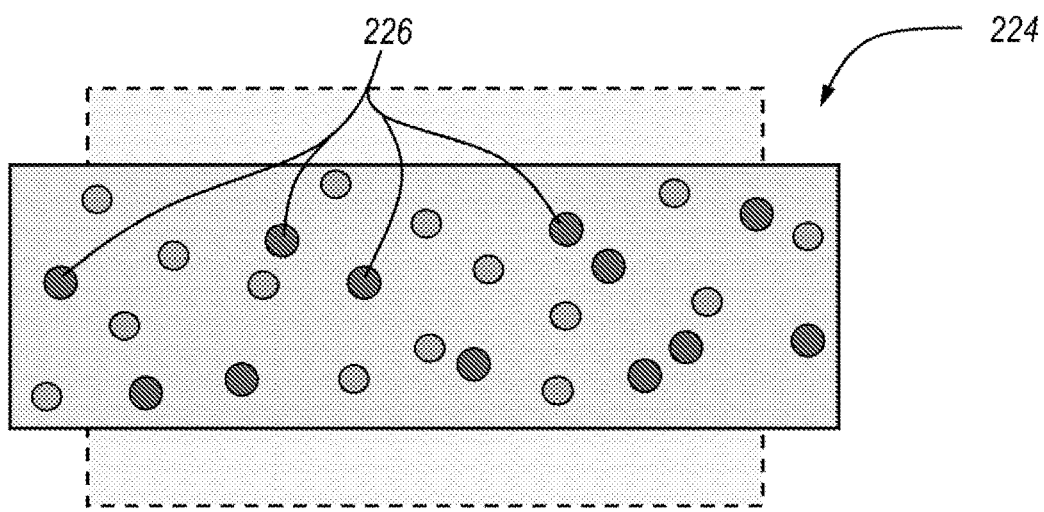
Figure 3:
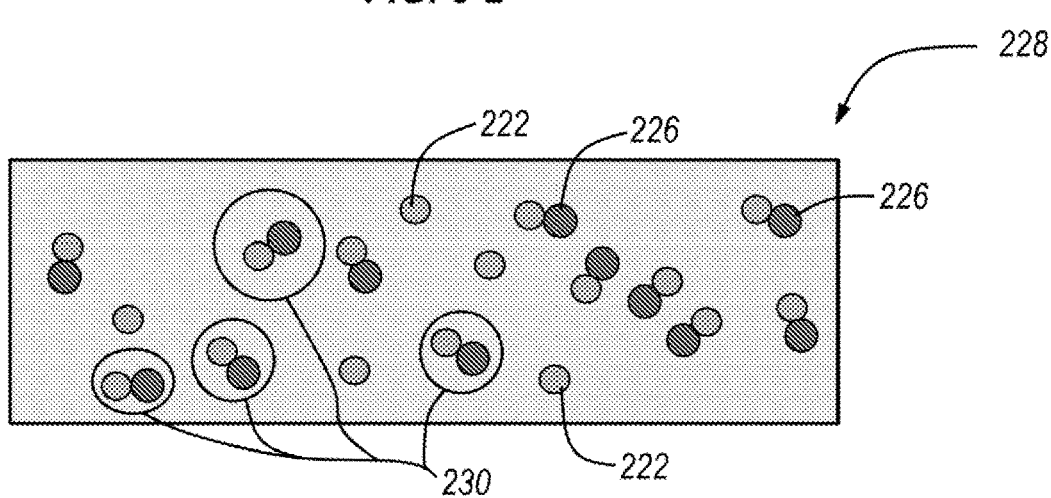
Figures 1, 4:
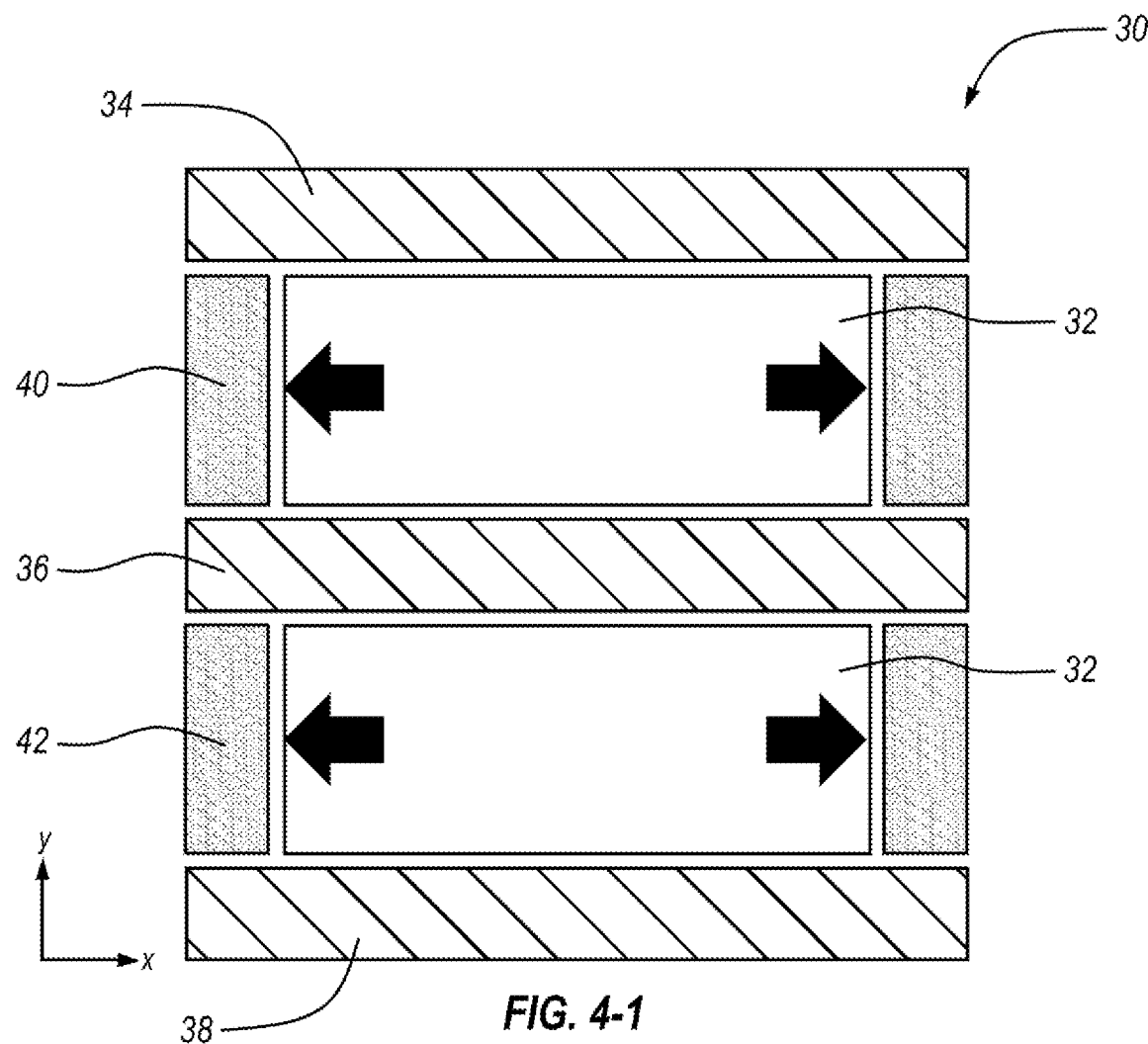
Figures 2, 4:
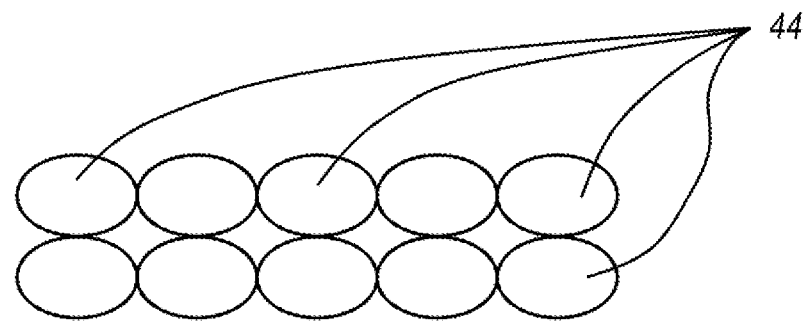
Figures 1, 5:
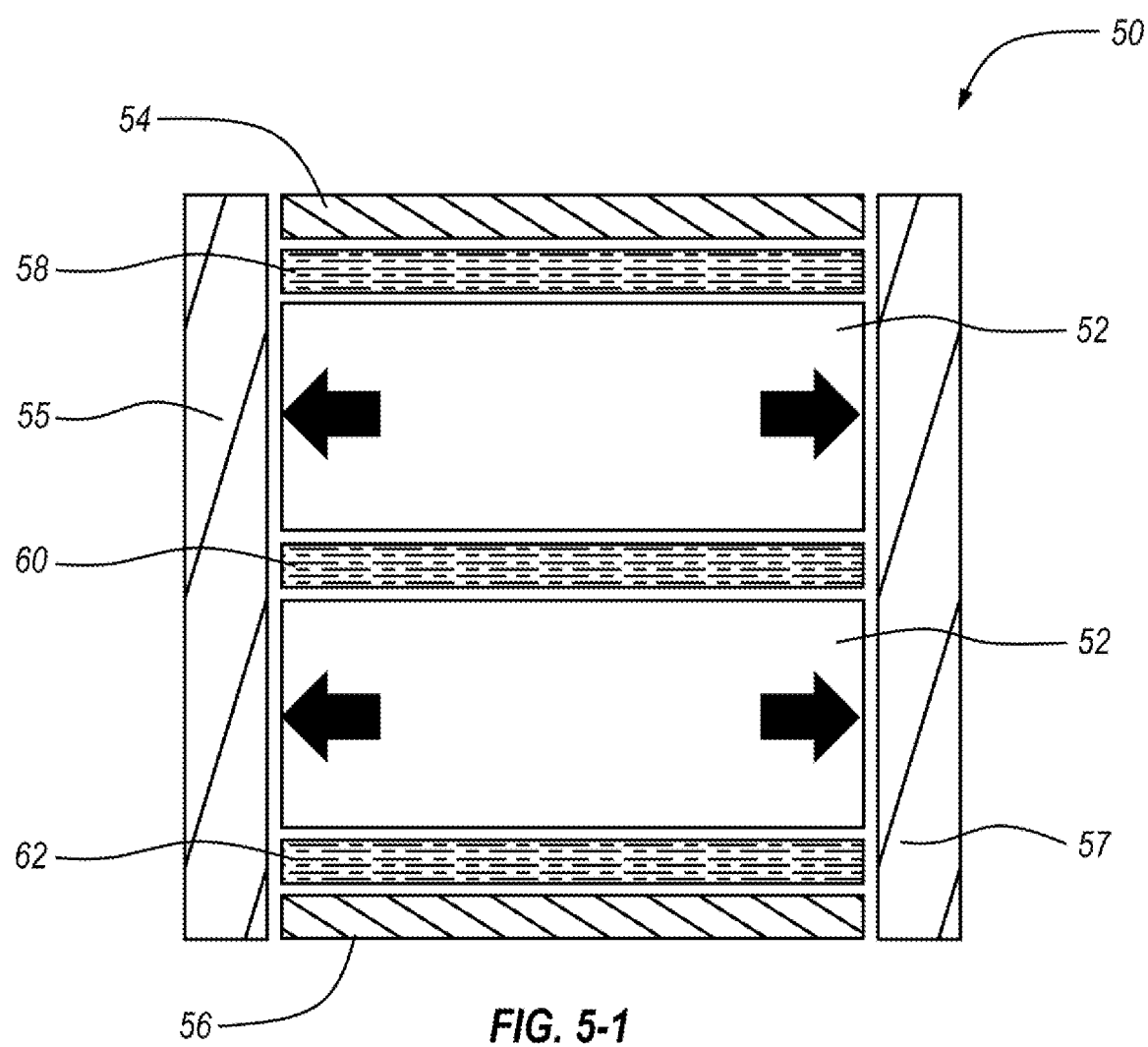
Figures 2, 5:
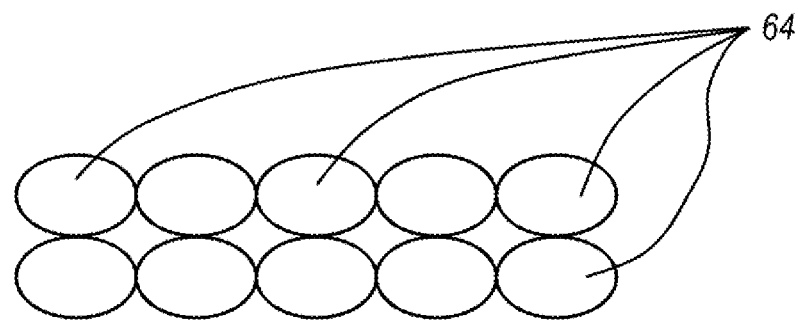

FIG. 5-1 illustrates an example cell 50 according to some embodiments, and which is specially configured to receive an equalized force from an HPHT press apparatus and impose a differential pressure onto the volume of diamond grains contained therein to increase the amount of plastic deformation of the diamond grains, and thereby increase the number or concentration of nitrogen vacancy centers formed therein. In an example, the cell 50 is configured having one or more internal chambers 52 configured to accommodate a volume of diamond grains or a mixture of diamond grains and catalyst material therein. The cell 50 includes axial elements 54 and 56 that are axially offset from each other on respective top and bottom portions of the cell. In some embodiments, the axial elements 54, 56 are formed from a high density material with minimal porosity. The cell 50 of FIG. 5-1 also includes radial elements 55 and 57 that are optionally formed from a low density material with a high degree of porosity. In an example, the low density material can be a low density solid such as MgO and/or $ZrO_2$ that is not sintered to full density and contains significant porosity, and combinations thereof, or the like. While separate radial elements 55, 57 are shown in some embodiments, the radial elements 55, 57 are an integral piece formed, for example, as a cylinder extending fully or partially around the chambers 52.

The cell 50 can also include one or more intermediate axial elements 58, 60, and 62. In the illustrated embodiment, the axial element 58 is placed between the axial element 54 and a top of a first internal chamber 52, the axial element 60 is placed between the first and second internal chambers 52, and the axial element 62 is placed between the axial element 56 and a bottom of the second internal chamber 52. In an example embodiment, the intermediate axial elements 58, 60, and 62 are at least partially formed from an incompressible material. In an example, the incompressible material may be a fluid such as a liquid metal such as iron, nickel, cobalt, or the like, or combinations thereof. These metals can be confined within refractory metal containers to control the location of the material within the cell as melting occurs. The cell can likewise be constructed using cermets containing these metals, such as WC—Co, WC—Ni, WC—Fe, or the like, or combinations thereof.

Configured in this manner, when subjected to the equalized pressure of the press apparatus during the HPHT process, the cell 50 can operate to impose a differential pressure onto the volume of diamond grains. In this example, the cell 50 imposes a greater pressure in the axial direction (due to the presence of the incompressible intermediate axial elements 58, 60, and 62) than in the radial direction. The pressure differential can subject the diamond grains to a differential strain, e.g., one that is negative in the axial direction and positive in the radial direction, and increase the degree of plastic deformation of the diamond grains. While the example cell 50 is configured to impose a greater pressure in the axial direction than in the radial direction, cells as disclosed herein may be configured to impose a greater pressure in the radial direction than in an axial direction, or may be configured to impose differential or asymmetric pressure in other directions, and that all such cells configured to impose a differential or asymmetric pressure in different directions on the volume of diamond grains for the purpose of increasing plastic deformation of the diamond grains are understood to be within the scope of this disclosure.

FIG. 5-2 illustrates diamond grains 64 as deformed by using the cell 50 and imposing a differential force during the HPHT process, which subjects the diamond grains to a differential strain. As illustrated, the resulting diamond grains are shown to have an aspect ratio as measured between a width dimension and a height dimension that is greater than one. The differential pressure imposed on the diamond grains can operate to subject the diamond grains to differential strain that increases the degree of plastic deformation among the diamond grains, thereby operating to create a greater number or concentration of nitrogen vacancy centers therein when compared using the symmetric pressure of cell 10 of FIG. 1-1 during HPHT processing as discussed herein. The cell 50 can also operate to drive creation of NV centers in the luminescent diamond during an HPHT process under the same or similar temperature conditions described with reference to the cell 30 illustrated in FIG. 4-1.

Figures 1, 6:
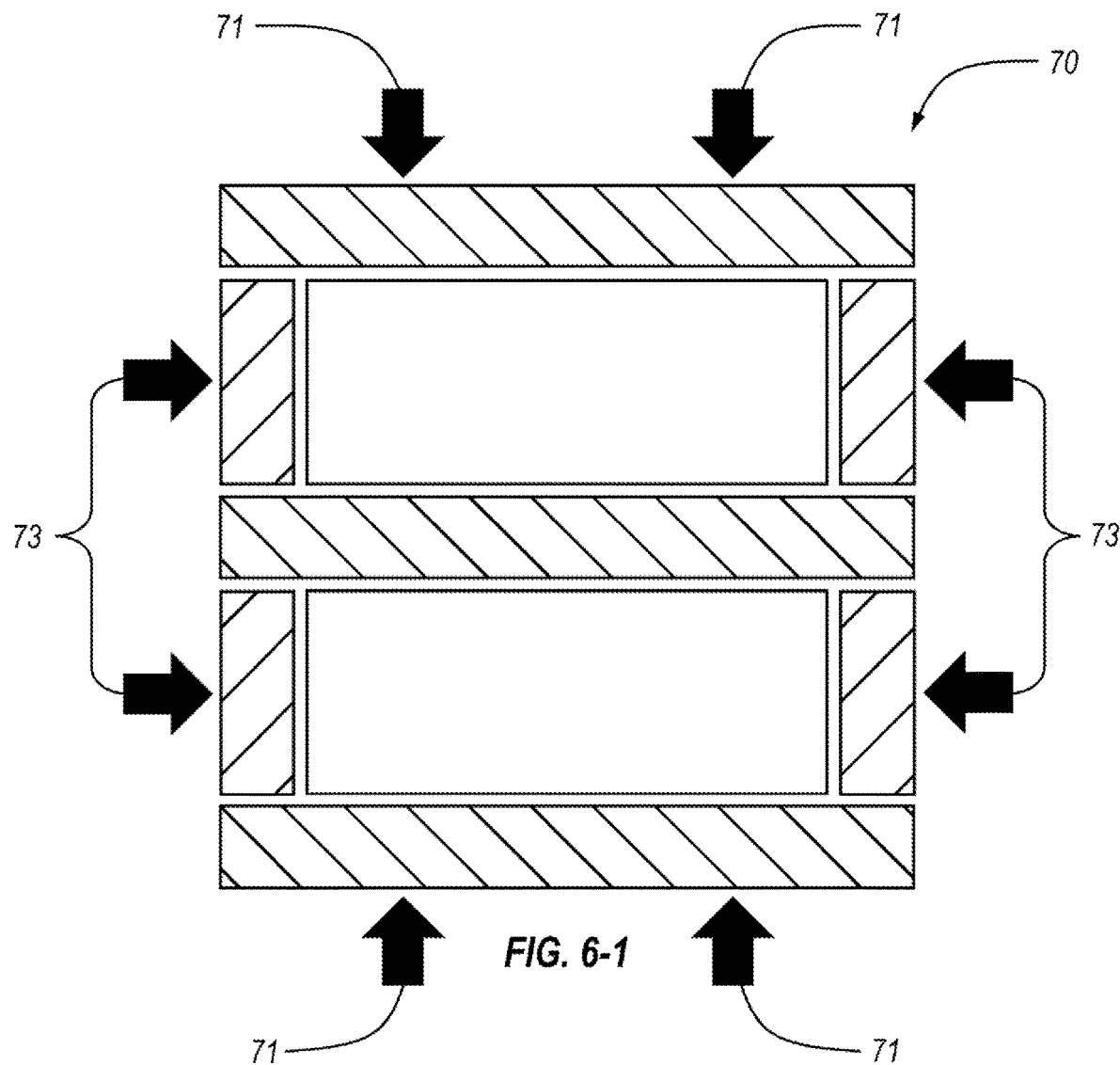
Figures 2, 6:
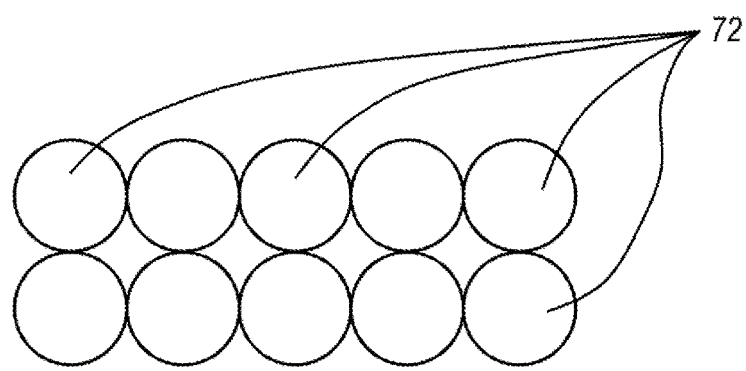

FIG. 6-1 illustrates a cell 70 that may be used with a conventional press apparatus configured to impose an equalized force (i.e., equal force in the axial directions 71 and radial directions 73) onto the cell 70 during the HPHT process used to form luminescent diamond. The cell 70 may therefore be similar to the cell 10 of FIG. 1-1.

As illustrated, the pressure imposed on the cell 70 by the press apparatus is the same in the radial and axial directions, thereby subjecting the diamond grains to an equalized strain that limits plastic deformation. FIG. 6-2 illustrates diamond grains 72 as deformed by using the standard cell 70 and imposing an equalized force during the HPHT Process. As illustrated, the resulting diamond grains subjected to the equalized strain are shown to have an aspect ratio as measured between a width dimension and a height dimension that is approximately one. As described herein, luminescent diamond made by HPHT process using such cell 70 and press apparatus at symmetric HPHT process pressured and temperatures can create a greater amount of NVN centers than is desired, and potentially more NVN centers than NV centers, thereby emitting an amount of luminescence in the red wavelength spectrum that may not be sufficient or desirable for certain end-use applications, i.e., those calling for a high amount of luminescence in the red wavelength spectrum.

Figures 1, 7:
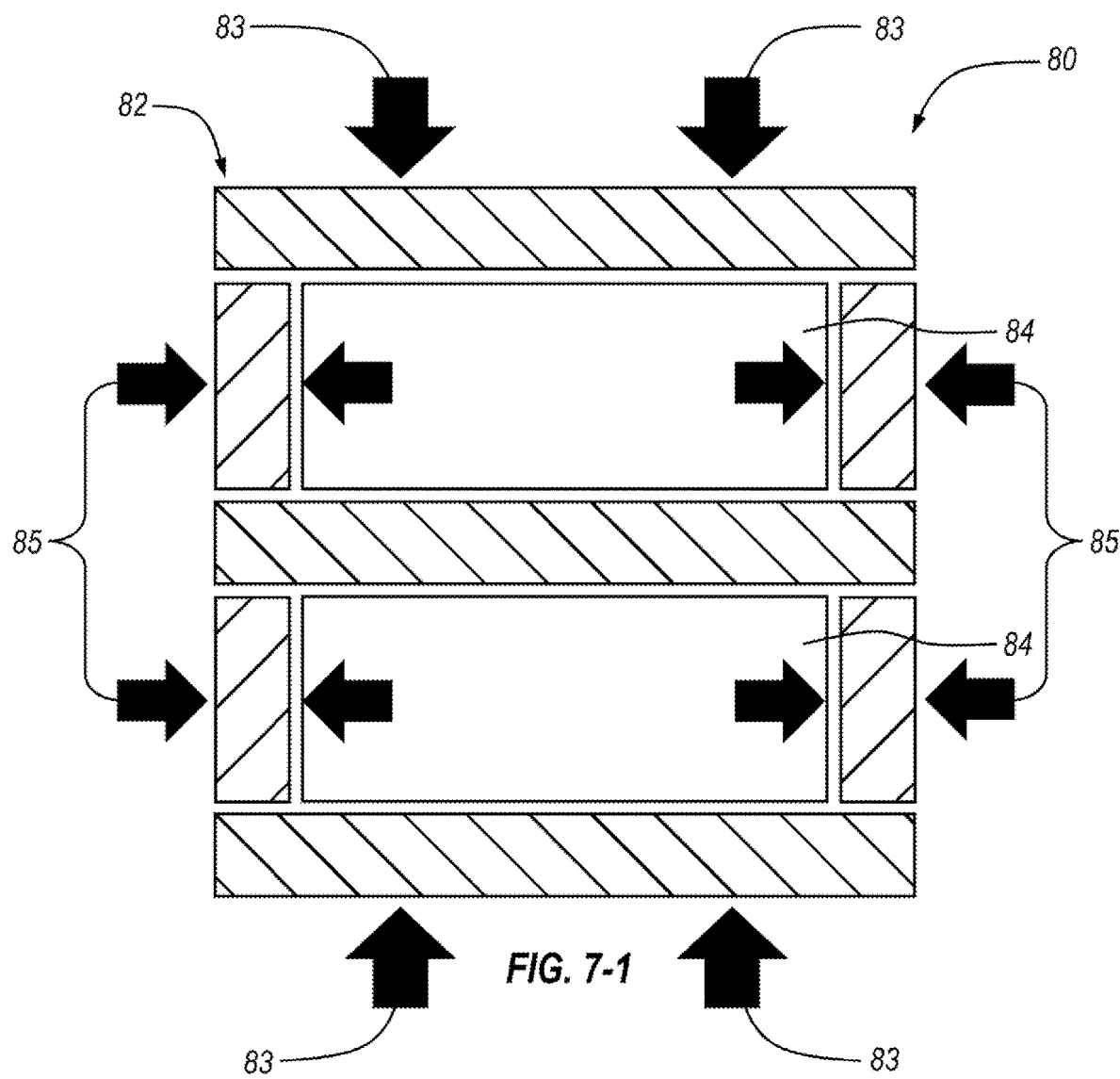
Figures 2, 7:
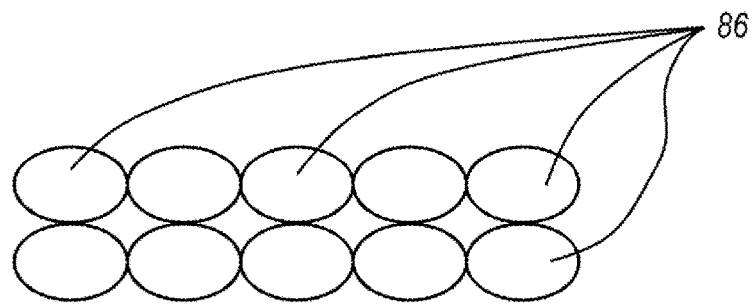

FIG. 7-1 illustrates an example press apparatus 80 that is configured to impose a differential or asymmetric pressure on a cell 82, and includes a volume of diamond grains or a mixture of diamond grains in one or more internal chambers 84 during HPHT processing. In an example, the press apparatus 80 may be of any type that is capable of imposing a differential or asymmetric pressure in an axial direction than in a radial direction onto the cell 82. In an example, the press apparatus 80 may be a conventional or proprietary cubic press, a solid frame press, a belt press, or the like. In the illustrated example, the press apparatus 80 is configured to impose a differential pressure on the cell 82 that is greater in an axial direction 83 than in a radial direction 85, thereby subjecting the diamond grains to a differential strain as explained above. It is to be understood that the pressure apparatus as disclosed herein may alternatively be configured to impose a pressure on the cell 82 that is greater in a radial direction than an axial direction. Accordingly, it is to be understood that press apparatus as disclosed herein may be configured to impose a greater pressure in the radial direction than in an axial direction, or may be configured to impose differential or asymmetric pressure in other directions, and that all such press apparatus that are configured to impose a differential or asymmetric pressure in different directions on the cell for the purpose of increasing plastic deformation are understood to be within the scope of this disclosure.

In an example, the cell 82 may be a standard cell that is configured to not itself create a differential pressure between the press apparatus and the volume of diamond grains in the internal chambers 84. Alternatively, the cell may be an example cell as disclosed above that is configured to contribute to the differential pressure imposed on it by the press apparatus, e.g., while the press apparatus imposes a degree of differential pressure the cell itself may operate to enhance the degree of differential pressure imposed on the diamond volume. In an example, the press apparatus 80 is operated during an HPHT process under the same or similar temperature conditions described herein to promote increased formation of NV centers in the resulting luminescent diamond.

FIG. 7-2 illustrates diamond grains 86 as deformed by using the press apparatus 80 and cell 82, wherein the press apparatus imposes a differential force onto the cell during the HPHT process. As illustrated, the diamond grains are subjected to a differential strain that produces diamond grains shown to have an aspect ratio as measured between a width dimension and a height dimension that is greater than one. As illustrated in FIG. 5-2, the differential pressure transmitted by the cell and imposed on the diamond grains operates to increase the degree of plastic deformation among the diamond grains to thereby create a greater number or concentration of nitrogen vacancy centers therein when compared using the standard press apparatus configured to impose an equalized or symmetric pressure on the cell during HPHT processing as discussed above.

A feature of some of the cells and presses as disclosed herein is the ability to impose a dynamic or asymmetric pressure on the diamond grains during HPHT processing.

The ability of diamond to plastically deform can also be increased by applying higher temperatures. Various structures and components described herein may therefore be used as means for imposing an asymmetric pressure on diamond grains or on an internal chamber during HPHT processing. Example means may include cells with constructions that use a symmetric pressure on the exterior of the cell to impose an asymmetric pressure on the internal chambers of the cell (e.g., FIGS. 4-1 and 5-1), presses with constructions that apply different pressures in different directions (e.g., FIG. 7-1), or combinations thereof. In some embodiments, HTHP processing at the temperature conditions described herein operate to increase the degree or amount of plastic deformation in the diamond grains that operate to increase the number or concentration of vacancies for a controlled amount of available nitrogen (via the controlled temperature of the HPHT process) to thereby form NV centers in contrast to NVN centers, or in concentrations exceeding those of NVN centers. Thus, luminescent diamond formed in this manner can emit a greater amount of luminescence in the red wavelength spectrum than luminescent diamond formed using HPHT processing cells and/or press apparatus under more conventional diamond sintering HPHT temperatures or other processes that produce more significant numbers or concentrations of NVN centers.

In an example embodiment, the diamond grains are combined with a non-metal solvent catalyst that is a carbonate such as sodium carbonate. In an example, the amount of sodium carbonate that is used may be an amount sufficient to form a completely sintered carbonate PCD (CPCD) body, e.g., up to 5% by weight based on the total weight of the carbonate catalyst and the diamond grains. Billets made with sodium carbonate are intrinsically less dark than cobalt PCD, which is believed to contribute to a higher level of luminescent emission and intensity as dark colored materials indicate the absorption of visible light. In some embodiments, it may be desired that the amount of catalyst material used be less than that useful to form a completely sintered PCD body, e.g., less than 5% by weight catalyst (compared to the total weight of the diamond layer or PCD body). In such embodiments, it may be desired to produce a partially-sintered or semi-sintered PCD body that includes both intercrystalline bonded diamond and free diamond grains for the purpose of easing the downstream process of sizing the PCD body into nano-sized diamond pieces or grains as better described below.

When the diamond grains are compacted under HPHT conditions, plastic deformation can occur due to the shear stress created by point contacts among the diamond grains or particles. To create large numbers or concentrations of vacancies, it can be useful to heat the diamond grains; however, high HPHT temperatures can also result in graphitization of the diamond because most of the diamond particle surface is pressure free (voids inside the compact). To avoid diamond graphitization, these voids on diamond surfaces inside the compact may require or benefit from application with pressure. In an effort to minimize unwanted diamond graphitization while maintaining a desired amount of plastic deformation to create nitrogen centers or vacancies it is useful to use an optimized range of the catalyst material such as sodium carbonate. The range of catalyst material is developed to balance shear stress applied by the point contacts among particles to create plastic deformation and vacancies, and the hydraulic pressure from the catalyst material melt located between diamond particles to restrict or even prevent diamond graphitization.

Figure 8:
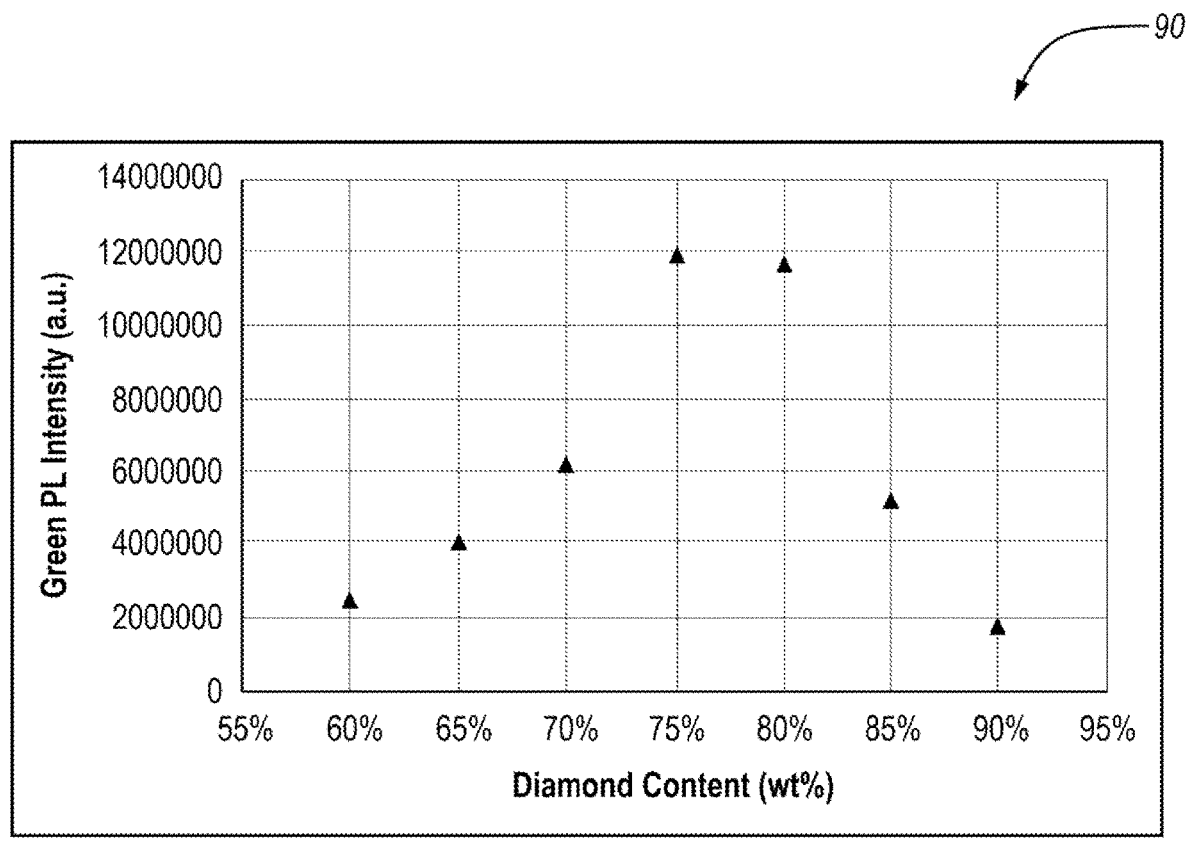
FIG. 8 is a graph that shows the photoluminescent intensity of photoluminescent diamond as a function of diamond content, according to some embodiments of the present disclosure.

FIG. 8 is a graph 90 that shows an effect of luminescent diamond having photoluminescent intensity in the green wavelength spectrum as excited with 473 nm laser for diamond pellets formed from 12 μm to 22 μm diamond grains and sodium carbonate sintered at approximately 2200° C. as a function of diamond content. As illustrated in the graph, the photoluminescent intensity of the luminescent diamond decreases when the diamond grains or particles are mixed with more than about 30 wt % sodium carbonate. Sodium carbonate melts at a temperature above 1400° C. with a sintering pressure of between about 5 GPa and 7 GPa. When the sodium carbonate content used is above about 30 wt %, the diamond particles are fully surrounded with the sodium carbonate melt and thus there are fewer direct diamond/diamond point contacts during HPHT sintering. This results in less shear stress applied to the diamond particles for plastic deformation and fewer nitrogen vacancy centers are thus generated inside the diamond lattice. Fewer nitrogen vacancy centers also cause fewer NVN optical centers inside the diamond particles, which explains the decreased green photoluminescent intensity within increased sodium carbonate content. When the sodium carbonate content is less than about 20 wt %, a significant drop in green photoluminescent intensity also occurs. Although more direct diamond/diamond particle point contacts occurs when the sodium carbonate content is low, there is not enough sodium carbonate present to cover the diamond pressure free surface during HPHT sintering. Thus, it is more likely that the uncovered diamond surface be graphitized after sintering.

Figure 9:
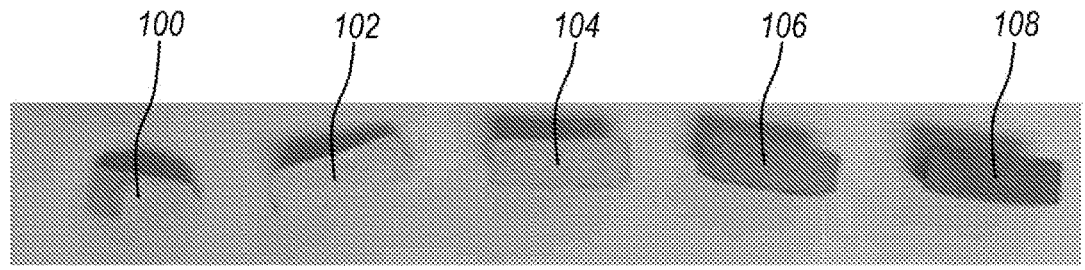
FIG. 9 is a photograph of luminescent diamond pellets sintered at the same temperature and having different diamond contents, according to some embodiments of the present disclosure.

FIG. 9 shows a fracture surface of diamond pellets 100, 102, 104, 106, and 108 formed in the manner described above with reference to FIG. 8 after sintering, and having different diamond contents (diamond grains and sodium carbonate). Diamond pellet 100 has a diamond content of 70 wt % or 30 wt % sodium carbonate, diamond pellet 102 has a diamond content of 75 wt % or 25 wt % sodium carbonate, diamond pellet 104 has a diamond content of 80 wt % or 20 wt % sodium carbonate, diamond pellet 106 has a diamond content of 85 wt % or 15 wt % sodium carbonate, and diamond pellet 108 has a diamond content of 90 wt % or 10 wt % sodium carbonate. As shown, as the diamond content increases, the color of the diamond pellet becomes darker, which is related to diamond graphitization as explained above. When the diamond content is 85 wt %, the sintered diamond pellet 106 is a grey color, which corresponds to the identified drop in luminescent intensity for the 85 wt % diamond content diamond illustrated in FIG. 8. Accordingly, based on this information, an optimized composition range is between about 75 wt % to 80 wt % diamond content, although such composition may vary based on a number of factors, including the desired luminescence, catalyst material, and the like.

Since the luminescent intensity can depend on limiting how to prevent the diamond graphitization and also how to provide a desired degree of shear stress amount the diamond particles experience during HPHT sintering, the manner in which the diamond particles and the sodium carbonate is combined can also play a role. In an example, it may be desired to have uniform mixing between the diamond grains or particles and the sodium carbide material (e.g., where a non-uniform mixture may function to shift the optimum composition windows from a desired diamond content (e.g., 75 wt % to 80 wt %) based on the total weight of the diamond grains and the sodium carbonate. Mostly, more sodium carbonate may be needed to prevent diamond graphitization in a situation with the combination or mix of diamond grains and sodium carbonate is not very uniform. While a particular optimized diamond content window has been provided, it is to be understood that the use of different types of non-catalyst solvents (e.g., other than sodium carbonate) will have also different optimal sintering compositions.

In an example, luminescent diamond made by the HPHT processes disclosed herein may have an diamond content of from 70 to 100 wt %, 80 to 95 wt %, greater than 80 wt %, and in a particular example approximately 85 wt % based on the total weight of the diamond and catalyst material, e.g., sodium carbonate, which diamond content is optimized to provide a desired amount of green photoluminescent intensity. In an example, the photoluminescent intensity is determined from the luminescent diamond as provided in the form of a suspension of the luminescent diamond in water, wherein such form may be associated with a particular use application such as for medical diagnostic use or the like. In such example, it has been discovered that a luminescent diamond having a higher diamond content as noted above, e.g., greater than about 80 wt %, provides a desired higher amount of photoluminescent intensity when provided in the form of a suspension.

In an example, the luminescent diamond comprising the increased diamond content, e.g., of greater than about 80 wt %, is formed using a mixture of diamond grains having an average particle size of from 12 μm to 22 μm as combined with a carbonate catalyst such as sodium carbonate. The mixture is subjected to HPHT processing conditions as described above with or without introducing asymmetric or differential pressure through the cell or the press. In an example, the HPHT process used is one that takes place at a temperature of approximately 2200° C., and does not impose asymmetric or differential pressure. The resulting luminescent diamond is provided in the form of pellets comprising. For purposes of preparing the desired luminescent diamond suspension, the luminescent diamond pellets are washed to remove the sodium carbonate. In an example, the material used to wash the pellets will depend on the type of catalyst present in the luminescent diamond pellets, and one that solubilizes the catalyst material for removal from the luminescent diamond pellets. In an example where the catalyst is sodium carbonate, water is used to wash the luminescent diamond pellet to remove the sodium carbonate. In an example the luminescent diamond pellets are placed in heated or boiling water during the wash process. The washed luminescent diamond pellets are then milled or otherwise reduced in size to generate nano-sized luminescent diamond particles. In an example, the luminescent diamond particles are sized into particles having an average particle size of approximately 100 nanometers. While a particular particle size has been disclosed, it is to be understood that the luminescent diamond particles may be sized larger or smaller than 100 nanometers having similar features in photoluminescence, retaining a desired brightness. In an example, the nano-sized luminescent diamond particles are heat treated at a temperature of from about 400 to 550° C. in an air environment. The heat treatment temperature will vary depending on the particular size of the luminescent diamond particles, e.g., larger sized luminescent diamond particles may be heat treated at a temperature that is higher than smaller sized luminescent diamond particles. In an example where the luminescent diamond particles have an average particle size of approximately 100 nanometers, the heat treatment temperature may be from about 500 to 525° C.

Figures 1, 10:
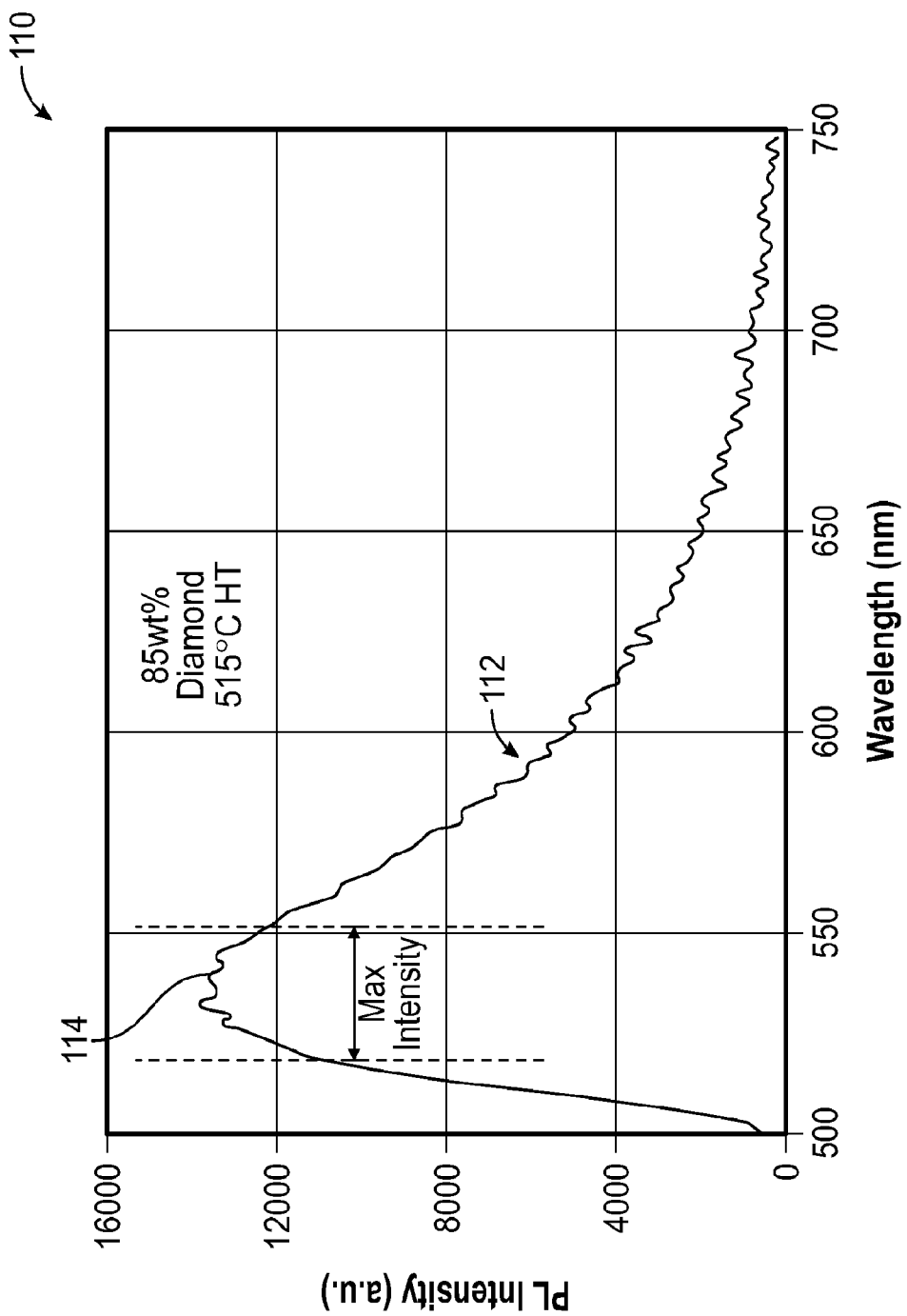
Figures 2, 10:
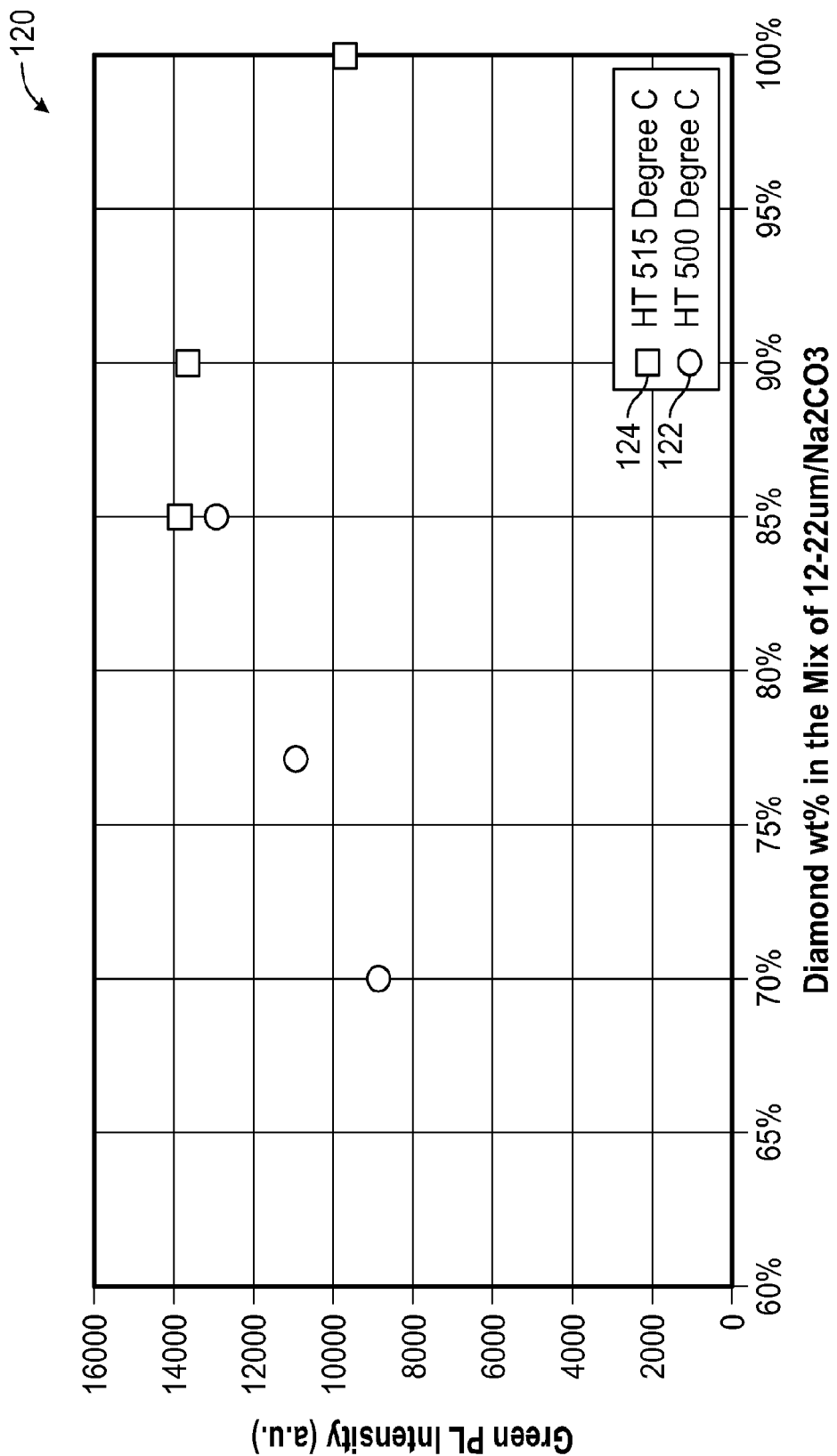

FIG. 10-1 is a graph 110 of the luminescent response 112 of 100 nanometer luminescent diamond in a 0.1 wt % suspension in deionized water and illuminated with a 473 nm laser. The nanodiamond material was made by HPHT treatment of a mixture of approximately 85% 12-22 μm diamond and approximately 15% sodium carbonate, followed by a rinse treatment to remove the sodium carbonate, diamond milling to approximately 100 nm, and heat treating at approximately 515° C. The maximum photoluminescent intensity 114 was observed at wavelengths between approximately 520 and 550 nm.

FIG. 10-2 is a graph 120 that shows an effect of luminescent diamond having maximum photoluminescent intensity in the green wavelength spectrum as excited with 473 nm laser for 100 nm luminescent diamond particles as disclosed above provided in the form of an aqueous suspension. The luminescent diamond materials were made by HPHT treatment of varying compositions of 12-22 μm diamond and sodium carbonate, these being from approximately 70%-100% diamond with the balance being sodium carbonate. In an example, the luminescent diamond suspension was prepared by dispersion of the 100 nm luminescent diamond particles in deionized water to form a 0.1 wt % suspension, i.e., comprising 0.1 wt % 100 nm luminescent diamond particles based on the total weight of particles and the water. As illustrated in the graph 120, the photoluminescent intensity of the luminescent diamond solution increases as the diamond content during HPHT treatment increases from approximately 70 wt %, and appears to reach a maximum photoluminescent intensity at approximately 85 wt %. All samples had maximum luminescence intensity between approximately 520 and 550 nanometers, similar to that illustrated in FIG. 10-1 described above.

The photoluminescent intensity of two different luminescent diamond suspensions, one suspension 122 comprising diamond particles heat treated at approximately 500° C., and another suspension 124 comprising diamond particles heat treated at approximately 515° C. is illustrated in FIG. 10-2. As illustrated, the luminescent diamond suspension having approximately 85 wt % diamond that was heat treated at approximately 515° C. displayed a higher photoluminescent intensity than that of the luminescent diamond suspension having approximately 85 wt % diamond that was heat treated at a lower temperature of approximately 500° C. This result illustrates the beneficial impact that heat treating at a higher temperature has on increasing the photoluminescent intensity. However, there is a point where the heat treatment temperature may cause the luminescent diamond to graphitize, which operates to reduce or decrease the photoluminescent intensity. Thus, it is desired that the nano-sized luminescent diamond particles as provided in suspension be heat treated within the temperature range disclosed for purposes of optimizing photoluminescent intensity and not causing unwanted diamond graphitization. Indeed, in some embodiments, the temperature of the heat treatment can be critical to obtaining desired photoluminescent intensity. Also, if the diamond particles prior to heat treatment have a darkened color (i.e., from graphite) then heat treating at the temperature range disclosed above operates to burn out (e.g., fully burn out) the graphite layer to boost photoluminescent intensity. However, it is desired in at least some embodiments that the heat treating temperature not be too high so as to prevent the diamond particles from being burnt out. Thus, the heat treating temperature range provided above operates to balance the potential benefit of obtaining an increased photoluminescent intensity without the potential drawback of having diamond weight loss from the diamond being burnt out. In an example, the heat treatment temperature of approximately 500° C. provides this balance while ensuring that the diamond particles do not darken (i.e., graphitize) during the heat treatment process or cycle.

As illustrated in the graph 120 of FIG. 10-2, the photoluminescent intensity of the luminescent diamond suspension starts to decrease as the diamond content exceeds approximately 85 wt %. However, the photoluminescent intensity of the luminescent diamond suspension having 90 wt % and even 100 wt % is shown to be greater than that of the luminescent diamond suspension having only 70 wt % diamond. Thus, this graph 120 helps to illustrate the positive impact that increased diamond content, e.g., of greater than about 80 wt %, has on providing an increased photoluminescent intensity for nano-sized luminescent diamond as disclosed herein as provided in the form of a suspension.

In measuring photoluminescent intensity, any suitable method may be used. For instance, time-resolved photoluminescence may be used by exciting a sample with a light pulse and measuring the decay with respect to time. The peak intensity over the measurement period may be used. Of course, other methods may also be used. In some embodiments, intensity is a unitless measurement, or may be normalized to be unitless.

Although a few example embodiments of luminescent diamond have been described in detail above, those skilled in the art will readily appreciate that many modifications are possible in the example embodiments without materially departing from the scope of the claims and present disclosure. For example, luminescent diamond as disclosed herein has been presented in the context of a biological end-use application. It is to be understood that luminescent diamond as disclosed herein may be use in end-use applications other than biological where a desired improved level of luminescence intensity is useful or beneficial. Other potential uses of luminescent diamond (e.g., those containing nitrogen vacancy centers) include but are not limited to usage in magnetic sensors, high resolution thermography, microscopic sensor arrays, anti-counterfeiting measures, ion concentration monitoring, membrane potential measurement, optical trapping, and strain/pressure sensors. Therefore, it is understood that luminescent diamond as disclosed herein is not intended to be limited to one particular end use application.

In other embodiments, HPHT conditions are described, but are illustrative only as different HPHT conditions may be used. For instance, materials described herein may be formed using different press technologies, in the presence of different catalyst materials, or with myriad other various. Thus, pressure or temperature conditions may vary in different embodiments. For instance, one HPHT press design may use different conditions than a different HPHT press design. Accordingly, process modifications and end-use applications of luminescent diamond are intended to be included within the scope of this disclosure as defined in the following claims.

In the description herein, various relational terms may be used to facilitate an understanding of various aspects of some embodiments of the present disclosure. Relational terms such as "top," "bottom", "above," "below", "left", "right", and the like may be used to describe various components, including their operational or illustrated position relative to one or more other components. Relational terms do not indicate a particular orientation for each embodiment within the scope of the description or claims, but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like may be used in the description or claims to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it does not preclude there being a single element, or more than one, of the additional element. Where the claims or description refer to "a" or "an" element, such reference is not be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment", "an embodiment", or "an example" of the present disclosure are not intended to be interpreted as excluding the existence of additional embodiments or examples that also incorporate the recited features. For example, any element described in relation to an embodiment herein may be combinable with any element of any other embodiment described herein.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function type claiming for any limitations of any of the claims herein, except for those in which the claim expressly uses the words 'means for' together with an associated function.

The Abstract at the end of this disclosure is provided to allow the reader to quickly ascertain the general nature of some embodiments of the present disclosure. It is submitted with the understanding that it will not be used to interpret or limit the scope or meaning of the claims.

What is claimed is:

1. A method of making luminescent diamond comprising:
   placing a volume of precursor diamond grains and catalyst material in a pressure cell; and
   applying an axial pressure and a radial pressure on the volume of precursor diamond grains and catalyst material, wherein the axial pressure is different from the radial pressure, resulting in a differential strain to the volume of precursor diamond grains and catalyst material by subjecting the pressure cell to high-pressure/high-temperature conditions to form one or more luminescent diamond pellets.

2. The method of claim 1, wherein the axial pressure is greater than the radial pressure, and wherein the one or more luminescent diamond pellets have a negative strain in an axial direction and a positive strain in a radial direction.

3. The method of claim 1, wherein the radial pressure is greater than the axial pressure, and wherein the one or more luminescent diamond pellets have a negative strain in a radial direction and a positive strain in an axial direction.

4. The method of claim 1, wherein the one or more luminescent diamond pellets resulting from subjecting the pressure cell to high-pressure/high-temperature conditions have an aspect ratio, or undergo an aspect ratio change, that is greater than one as measured between a radial dimension and an axial dimension.

5. The method of claim 1, wherein subjecting the pressure cell to high-pressure/high-temperature conditions comprises using a pressure apparatus to apply a pressure force to the pressure cell, wherein the pressure apparatus is configured to impose the axial pressure different than the radial pressure onto the pressure cell.

6. The method of claim 1, wherein subjecting the pressure cell to high-pressure/high-temperature conditions is performed at a temperature of 1,800° C. or less.

7. The method of claim 1, wherein subjecting the pressure cell to high-pressure/high-temperature conditions comprises causing the volume of precursor diamond grains to undergo plastic deformation to produce vacancies that promote a formation of nitrogen vacancy centers, wherein the luminescent diamond pellets have a luminescence in a red wavelength spectrum greater than diamond pellets subjected to a non-differential strain during high-pressure/high-temperature conditions.

8. A method for making luminescent diamond pellets comprising:
   placing a volume of precursor diamond grains and catalyst material in a pressure cell; and
   applying an axial pressure and a radial pressure on the volume of precursor diamond grains and catalyst material, wherein the axial pressure is different from the radial pressure, resulting in a differential strain to the volume of precursor diamond grains and catalyst material by subjecting the pressure cell to high-pressure/high-temperature conditions to form one or more luminescent diamond pellets,
   wherein a differential pressure produces a degree of plastic deformation in the luminescent diamond pellets that is greater than a different high-pressure/high-temperature process where the axial pressure and the radial pressure are approximately equal.

9. The method of claim 8, wherein the differential pressure subjects the luminescent diamond pellets to the differential strain that is positive in one dimension and negative in another dimension.

10. The method of claim 8, wherein the luminescent diamond pellets have a greater number or concentration of NV centers than NVN centers, N3 centers, or both NVN and N3 centers.

11. The method of claim 8, wherein the luminescent diamond pellets emit a greater amount of luminescence in a red wavelength spectrum than in a green wavelength spectrum.

12. The method of claim 8, wherein the volume of precursor diamond grains and catalyst material is in the pressure cell configured to provide the differential pressure.

13. The method of claim 8, wherein the volume of precursor diamond grains is in the pressure cell loaded into a pressure apparatus, and wherein the pressure apparatus is configured to provide at least a portion of the differential pressure.

14. The method of claim 8, wherein the luminescent diamond pellets have an aspect ratio, or undergo an aspect ratio change, of greater than one as measured between perpendicular dimensions of the luminescent diamond pellets.

* * * * *